(12) United States Patent
Lee et al.

(10) Patent No.: US 11,960,680 B2
(45) Date of Patent: Apr. 16, 2024

(54) TOUCH CONTROLLER, OPERATING METHOD OF THE SAME, AND TOUCH SENSING DEVICE INCLUDING TOUCH CONTROLLER

(71) Applicant: SAMSUNG ELECTRONICS CO., LTD., Suwon-si (KR)

(72) Inventors: Heejin Lee, Suwon-si (KR); Jinbong Kim, Suwon-si (KR); Sanho Byun, Suwon-si (KR); Jinchul Lee, Suwon-si (KR); Yunrae Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/978,705

(22) Filed: Nov. 1, 2022

(65) Prior Publication Data
US 2023/0134287 A1 May 4, 2023

(30) Foreign Application Priority Data

Nov. 3, 2021 (KR) .................. 10-2021-0149959
Jul. 7, 2022 (KR) .................. 10-2022-0083914

(51) Int. Cl.
*G06F 3/041* (2006.01)
*G06F 3/044* (2006.01)

(52) U.S. Cl.
CPC ........ *G06F 3/04182* (2019.05); *G06F 3/0412* (2013.01); *G06F 3/0443* (2019.05); *G06F 3/0446* (2019.05); *G06F 3/04166* (2019.05)

(58) Field of Classification Search
CPC .. G06F 3/0446; G06F 3/04166; G06F 3/0443; G06F 3/0412; G06F 3/0418; G06F 3/04182
(Continued)

(56) References Cited

U.S. PATENT DOCUMENTS 10,705,654 B2  7/2020 Kim et al.
11,079,878 B1  8/2021 Krah
(Continued)

FOREIGN PATENT DOCUMENTS

KR       10-1449490 B1    10/2014
KR    10-2021-0050099 A    5/2021
(Continued)

*Primary Examiner* — Jimmy H Nguyen
(74) *Attorney, Agent, or Firm* — Sughrue Mion, PLLC

(57) ABSTRACT

A touch controller includes a noise detection circuit that respectively provides a first reference voltage and a second reference voltage for detecting display noise to a first electrode and a second electrode arranged on lines except a line on which touch sensing is performed, among sensing electrodes, the second reference voltage being different from the first reference voltage, a driving signal generation circuit that receive a first noise voltage and a second noise voltage generated based on the first reference voltage and the second reference voltage and alternately selects the first noise voltage and the second noise voltage as a driving signal, and a receiving circuit that receives the driving signal, a touch sensing signal generated based on the driving signal from a third electrode arranged on the line on which touch sensing is performed, among the sensing electrodes, and generates a sensing voltage based on the touch sensing signal.

20 Claims, 17 Drawing Sheets

(58) Field of Classification Search
USPC .......................................................... 345/174
See application file for complete search history.

(56) References Cited

U.S. PATENT DOCUMENTS

| | | | |
|---|---|---|---|
| 11,307,709 B2 | 4/2022 | Jeong | |
| 2013/0300690 A1* | 11/2013 | Yang | G06F 3/044 |
| | | | 345/173 |
| 2015/0293636 A1 | 10/2015 | Park et al. | |
| 2018/0046325 A1* | 2/2018 | Kim | G06F 3/0412 |
| 2019/0355433 A1 | 11/2019 | Liang et al. | |
| 2020/0004368 A1* | 1/2020 | Kim | G06F 3/04164 |
| 2021/0173523 A1 | 6/2021 | Lee | |
| 2021/0200374 A1 | 7/2021 | Yuan | |

FOREIGN PATENT DOCUMENTS

| | | |
|---|---|---|
| KR | 10-2021-0064036 A | 6/2021 |
| KR | 10-2021-0086243 A | 7/2021 |

\* cited by examiner

TOUCH CONTROLLER, OPERATING METHOD OF THE SAME, AND TOUCH SENSING DEVICE INCLUDING TOUCH CONTROLLER

CROSS-REFERENCE TO RELATED APPLICATIONS

This application is based on and claims priority under 35 U.S.C. § 119 to Korean Patent Application No. 10-2021-0149959, filed on Nov. 3, 2021, and Korean Patent Application No. 10-2022-0083914, filed on Jul. 7, 2022 in the Korean Intellectual Property Office, the disclosures of each of which being incorporated by reference herein in their entireties.

BACKGROUND

The present disclosure relates to a touch sensing device, and more particularly, to a touch controller that reduces display noise, an operating method of the touch controller, and a touch sensing device including the touch controller.

As a distance between a display panel and a touch panel decreases, parasitic capacitance between electrodes of the display panel and the touch panel may increase, and display noise generated when the display operates may be introduced into a touch sensor array. The display noise may reduce touch sensing sensitivity.

SUMMARY

It is an aspect to provide a touch controller for improving touch sensing sensitivity, an operating method of the touch controller, and a touch sensing device including the touch controller.

According to an aspect of one or more embodiments, there is provided a touch controller stacked on a display panel, and configured to drive a touch sensor array comprising a plurality of sensing electrodes arranged in rows and columns, the touch controller comprising a noise detection circuit configured to respectively provide a first reference voltage and a second reference voltage for detecting display noise to a first electrode and a second electrode arranged on lines except a line on which touch sensing is performed, among the plurality of sensing electrodes, the second reference voltage being different from the first reference voltage; a driving signal generation circuit configured to receive a first noise voltage and a second noise voltage generated based on the first reference voltage and the second reference voltage from the first electrode and the second electrode, respectively, and alternately select the first noise voltage and the second noise voltage as a driving signal and output the driving signal; and a receiving circuit configured to receive the driving signal via a first input terminal, receive a touch sensing signal generated based on the driving signal via a second input terminal connected to a third electrode arranged on the line on which touch sensing is performed, among the plurality of sensing electrodes, and generate a sensing voltage based on the touch sensing signal and the driving signal.

According to another aspect of one or more embodiments, there is provided a touch sensing device comprising a touch sensor array including a plurality of sensing electrodes stacked on a display panel and arranged in rows and columns; and a touch controller connected to the touch sensor array via the plurality of sensing electrodes. The touch sensor array comprises a first electrode and a second electrode arranged on lines except a line on which touch sensing is performed, among the plurality of sensing electrodes; and a third electrode arranged on the line on which the touch sensing is performed, among the plurality of sensing electrodes. The touch controller comprises a noise detection circuit configured to respectively provide a first reference voltage and a second reference voltage for detecting display noise to the first electrode and the second electrode, the second reference voltage being different from the first reference voltage; a driving signal generation circuit configured to receive a first noise voltage and a second noise voltage that are generated based on the first reference voltage and the second reference voltage from the first electrode and the second electrode, respectively, and alternately select the first noise voltage and the second noise voltage as a driving signal and output the driving signal; and a receiving circuit configured to receive the driving signal via a first input terminal, receive a touch sensing signal generated based on the driving signal via a second input terminal connected to the third electrode, and generate a sensing voltage based on the touch sensing signal and the driving signal.

According to another aspect of one or more embodiments, there is provided an operating method of a touch controller configured to drive a touch sensor array comprising a plurality of sensing electrodes stacked on a display panel, and arranged in rows and columns, the operating method comprising providing respectively a first reference voltage and a second reference voltage for detecting display noise to a first electrode and a second electrode arranged on lines except a line on which touch sensing is performed, among the plurality of sensing electrodes; receiving a first noise voltage and a second noise voltage generated based on the first reference voltage and the second reference voltage from the first electrode and the second electrode, respectively; selecting alternately the first noise voltage and the second noise voltage as a driving signal and outputting the driving signal; receiving the driving signal from a first input terminal, and receiving a touch sensing signal generated based on the driving signal via a second input terminal connected to a third electrode arranged on the line on which touch sensing is performed, among the plurality of sensing electrodes; and generating a sensing voltage based on the touch sensing signal and the driving signal.

BRIEF DESCRIPTION OF THE DRAWINGS

Embodiments will be more clearly understood from the following detailed description taken in conjunction with the accompanying drawings in which.

DETAILED DESCRIPTION

A touch screen may include a display panel for image display and a touch panel for touch sensing, and the display panel and the touch panel may be vertically stacked or share at least one layer, and be formed in one body while sharing at least one layer. As discussed above, as the distance between the display panel and the touch panel decreases according to the tendency of the touch screen to be ultra-thin, parasitic capacitance between electrodes of the display panel and the touch panel may increase, and display noise generated when the display operates may be introduced into the touch sensor array by using a parasitic capacitor. The display noise may reduce touch sensing sensitivity. Accordingly, there is a need for an operating method of the touch controller that is capable of reducing noise due to the parasitic capacitance.

Hereinafter, various embodiments will be described in detail with reference to the accompanying drawings. As used herein, the terms "1st" or "first" and "2nd" or "second", etc. are used to refer to corresponding components regardless of importance or order and are used to distinguish one component from another without limiting the components.

Figure 1:
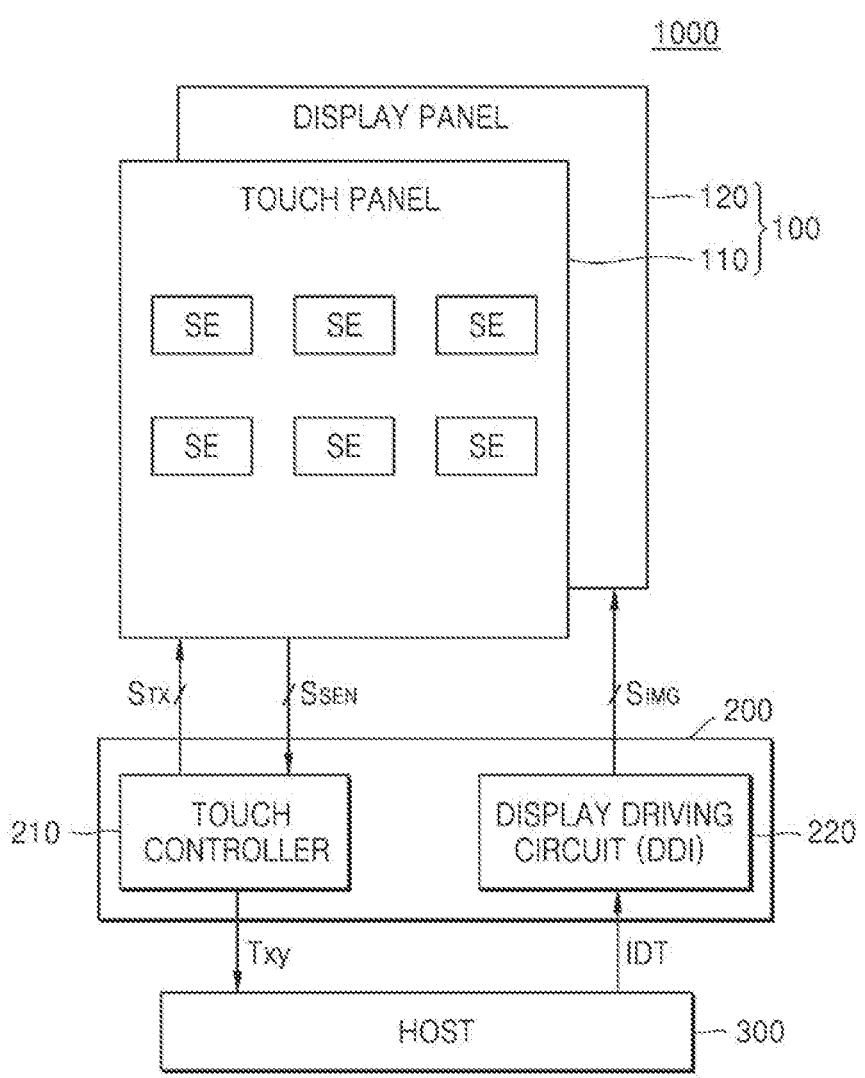
FIG. 1 is a block diagram of a touch screen device according to an embodiment.

FIG. 1 is a block diagram of a touch screen device 1000 according to an embodiment.

The touch screen device 1000 may be mounted on various electronic devices, and may be referred to as a "touch sensing device". For example, the touch screen device 1000 may be mounted on an electronic device, such as a tablet personal computer (PC), an e-reader, a personal digital assistant (PDA), a portable multimedia player (PMP), a mobile terminal, a smartphone, a wearable device, an Internet of Things (IoT) device, a refrigerator, or a navigation device. In some embodiments, the touch screen device 1000 may be mounted on an electronic device provided as a component of a vehicle, furniture, manufacturing equipment, a door, various measuring devices, etc.

Referring to FIG. 1, the touch screen device 1000 may include a touch screen 100 and a touch screen driving circuit 200 for driving the touch screen 100. The touch screen 100 may include a touch panel 110 and a display panel 120, and may provide a touch sensing function and a display function. The touch screen driving circuit 200 may include a touch controller 210 and a display driver integrated circuit (DDI) 220. The touch controller 210 and the DDI 220 may be integrated into one semiconductor chip or separately implemented as a plurality of semiconductor chips. In some embodiments, the touch sensor controller 210 and the DDI 220 may be implemented as one semiconductor module.

Although FIG. 1 illustrates that the touch screen device 1000 includes a host 300, embodiments are not limited thereto, and the host 300 may be implemented separately from the touch screen device 1000.

The touch screen 100 may display an image, and receive a touch input. The touch input may be received from a user. The touch screen 100 may operate as an input/output device of an electronic device, and may operate as a proximity sensor sensing access of a conductive object. In an embodiment, the touch screen 100 may further include a fingerprint sensor, and the touch screen device 1000 may perform a fingerprint recognition function.

The touch panel 110 may sense a touch (or touch input) on the touch screen 100 and output sensing signals $S_{SEN}$. In this case, the touch may include a conductive object directly contacting a screen 100 as well as the conductive object approaching the touch screen 100. For example, the conductive object may include a user's body part (for example, a finger, the palm, the face, the ear), a touch pen, a stylus pen, etc. The touch panel 110 may be stacked on the display panel 120, and may be attached to a front surface (for example, a surface from which optical signals are transmitted) of the display panel 120. In an embodiment, the touch panel 110 may cover the front surface of the display panel 120.

The touch panel 110 may be implemented as a transparent panel having a touch-sensitive surface. In some embodiments, the touch panel 110 may be implemented as a touch sensor array, in which transparent electrodes are patterned. In this specification, the touch panel 110 also may be referred to as a "touch sensor array".

The touch panel 110 may include a plurality of sensing electrodes SE (or "dot sensor") arranged in rows and columns. Sensing signals $S_{SEN}$ according to one of various touch sensing methods may be output via the plurality of sensing electrodes SE. For example, the plurality of sensing electrodes SE may output the sensing signals $S_{SEN}$ according to a capacitance sensing method.

As an embodiment, the touch panel 110 may have capacitance generated by each of the plurality of sensing electrodes SE. For example, capacitance may be generated between each of the plurality of sensing electrodes SE and ground (or a conductive layer in the touch screen 100), and the capacitance may be referred to as self-capacitance. In this case, the touch panel 110 may sense in a self-capacitance manner.

A driving signal $S_{TX}$ may be applied to each of the plurality of sensing electrodes SE, and a sensing signal $S_{SEN}$ may be output from each of the plurality of sensing electrodes SE. In other words, each of the plurality of sensing electrodes SE may operate as a driving electrode and a receiving electrode, and each of the plurality of sensing electrodes SE may be referred to as a sensing node of a touch panel 110

The driving signal $S_{TX}$ may be applied to the plurality of sensing electrodes SE as the driving electrode, the sensing signal $S_{SEN}$ indicating capacitance (for example, mutual capacitance or self-capacitance) may be generated based on the driving signal $S_{TX}$, and the sensing signal $S_{SEN}$ may be output as the receiving electrode. When a conductive object, such as a human finger, or a stylus pen contacts or approaches the sensing node of the touch panel 110, the capacitance corresponding to the sensing node may be changed, and the sensing signal $S_{SEN}$ output from the touch panel 110 may be changed according to the changed capacitance. For example, a level of the sensing signal $S_{SEN}$ may increase or decrease before a touch occurs. Touch data may be generated based on levels of the sensing signals $S_{SEN}$ output from the touch panel 110.

The display panel 120 may include a plurality of gate lines, a plurality of source lines, and a plurality of pixels arranged in rows and columns at points where the plurality of gate lines intersect with the plurality of source lines. The plurality of pixels may display an image based on image signals $S_{IMG}$ received via the plurality of source lines and the plurality of gate lines. The image may be updated according to a set frame rate.

The display panel 120 may be implemented with one of a liquid crystal display (LCD), a light emitting diode (LED) display, an organic LED (OLED) display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), or a vacuum fluorescent display (VFD), or with other types of flat panel displays or flexible displays.

Although FIG. 1 illustrates that the touch panel 110 and the display panel 120 are separate components, embodiments are not limited thereto. For example, the touch screen 100 may be implemented as an in-cell-type panel in which electrodes of the touch panel 110 and pixels of the display panel 120 are coupled to each other, or as an on-cell-type panel in which sensing electrodes of the touch panel 110 are arranged on the display panel 120.

The touch controller 210 may perform scanning (for example, driving and sensing) on the touch panel 110. In other words, the touch controller 210 may perform touch sensing. The touch controller 210 may provide the driving signal $S_{TX}$ to the driving and sensing electrodes of the touch panel 110, and may receive, from the touch panel 110, the sensing signals $S_{SEN}$ generated based on the driving signal $S_{TX}$.

The touch controller 210 may convert the sensing signals $S_{SEN}$, which are analog signals, into touch values, which are digital signals, and may generate touch data including the touch values corresponding to each sensing node of the touch panel 110.

The touch controller 210 may determine that a touch input has occurred at at least one particular position on the touch screen 100 based on the touch data, and may calculate a position where the touch input has occurred, i.e., a touch coordinate Txy. The touch controller 210 may transmit the touch coordinate Txy to the host 300. In an embodiment, the touch controller 210 may calculate touch pressure, and provide the touch pressure together with the touch coordinate Txy to the host 300.

In an embodiment, the touch controller 210 may remove display noise, by performing noise sensing (for example, display noise sensing) with touch sensing on the touch panel 110 simultaneously or at different time points, and alternately selecting and outputting noise voltages to detect noise (for example, the display noise) generated by the noise sensing. For example, the touch controller 210 may generate compensated touch data, by removing the display noise based on touch sensing. For example, by arranging the plurality of sensing electrodes SE on the touch panel, detecting the display noise by using the plurality of sensing electrodes SE, on which the touch sensing has not been performed, and compensating for or removing the display noise, the sensitivity of a touch sensing signal may be improved.

In an embodiment, the touch controller 210 may perform, on the touch panel 110, the noise sensing simultaneously with the touch sensing, remove a noise sensing signal from a touch sensing signal, and generate a noise-removed touch sensing signal.

In an embodiment, the touch controller 210 may improve sensitivity of a touch sensing signal, by removing the display noise by alternately selecting from the DDI 220 and outputting, on the display panel 120 where the display noise is generated, the display noise at a plurality of points.

The method described above of removing the display noise from the touch controller 210 and the operating method of the touch controller 210 by alternately selecting noise voltages and removing the display noise will be described in detail below with reference to the following drawings.

The DDI 220 may receive image data IDT from the host 300, and drive the display panel 120 to display, on the display panel 120, an image according to the image data IDT. The DDI 220 may convert the image data IDT into image signals $S_{IMG}$, which are analog signals, and may provide the image signals $S_{IMG}$ to corresponding pixels of the display panel 120.

The host 300 may perform the overall control operation on the touch screen device 1000. The host 300 may generate data related to the display operation and provide the data to the DDI 220. The host 300 may receive touch information, such as a touch coordinate Txy, from the touch controller 210, and perform a different control operation according to the touch information.

In an embodiment, the host 300 may include an application processor AP, and the application processor AP may be implemented as a system on chip (SoC). The SoC may include a system bus (not shown) to which a protocol having a certain standard bus specification is applied, and may include various intellectual properties (IP) related to the system bus. As a standard specification for a system bus, various types of specifications, such as an advanced microcontroller bus architecture (AMBA) protocol from Advanced RISC Machine (ARM), may be applied to the system bus.

Figure 2:
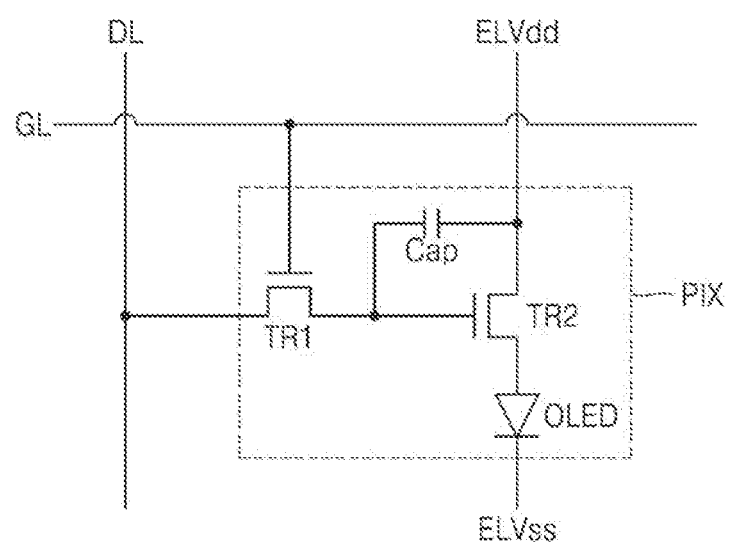
FIG. 2 is an example circuit diagram of one pixel among a plurality of pixels included in a display panel in FIG. 1, according to an embodiment.

FIG. 2 is an example circuit diagram of one pixel among the plurality of pixels included in the display panel 120 in FIG. 1. A pixel PIX illustrated in FIG. 2 may include an organic light emitting display (OLED) pixel. However, the scope of the present disclosure is not limited thereto.

Referring to FIGS. 1 and 2, the pixel PIX may include a first transistor TR1 and a second transistor TR2, a capacitor Cap, and an organic light emitting diode OLED. For example, in the pixel PIX illustrated in FIG. 2, the configuration thereof including the first and second transistors TR1 and TR2 is not limited thereto.

An anode of the organic light emitting diode OLED may receive a first power supply voltage ELVdd via the second transistor TR2. A cathode of the organic light emitting diode OLED may receive a second power supply voltage ELVSS. The first transistor TR1 may output a data signal applied to a data line DL in response to a signal applied to a gate line GL. The capacitor Cap mat charge a voltage corresponding to the data signal received from the first transistor TR1. The second transistor TR2 controls a driving current flowing through the organic light emitting diode OLED, in response to a voltage stored in the capacitor Cap. For example, the second power supply voltage ELVSS may be a ground voltage.

For example, while the pixel PIX is being driven, noise may be generated due to various components of the pixel PIX. For example, when a gate signal is provided via the gate line GL, noise may be generated at a cathode terminal of the organic light emitting diode OLED. For example, the cathode terminal of the organic light emitting diode OLED may be formed adjacent to the touch panel 110 in FIG. 1. In this case, as noise generated at the cathode terminal of the organic light emitting diode OLED flows into the touch panel 110, the reliability of the touch sensing operation may degrade.

Hereinafter, for convenience of description, noise generated at the cathode terminal of the organic light emitting diode OLED or flowing from the cathode terminal of the organic light emitting diode OLED may be referred to as display noise. However, this is simply for convenience of description, and display noise according to the technical concept may be a noise signal generated from or flowing from various components included in the touch panel 110.

Figure 3:
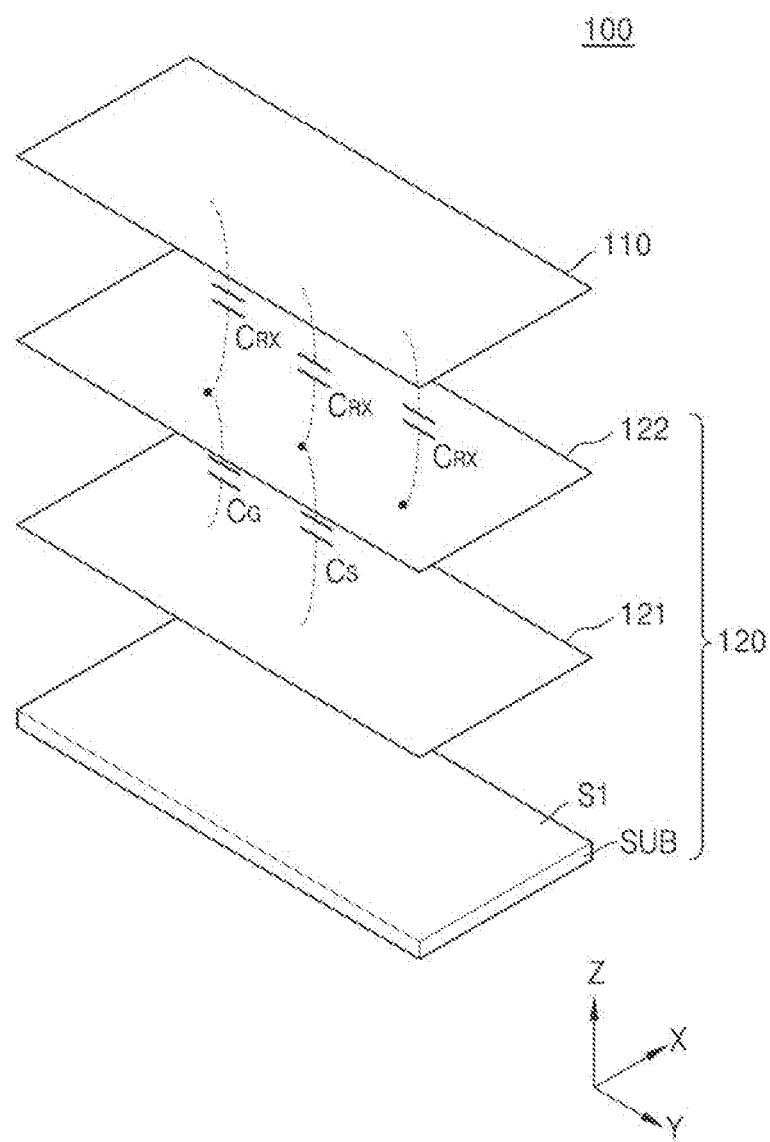
FIG. 3 is a diagram describing display noise introduced into a touch sensor array stacked on a display panel.

FIG. 3 is a diagram describing display noise introduced into a touch sensor array stacked on a display panel.

Referring to FIG. 3, the touch screen 100 may include a substrate SUB, a display layer 121, a common electrode 122, and the touch panel 110 (or referred to as the "touch sensor array"). However, embodiments are not limited thereto, and the touch screen 100 may further include other layers arranged between components described above. In some embodiments, the touch screen 100 may further include a top glass arranged on the touch panel 110.

The substrate SUB may include a first surface S1 extending in a first direction, for example, an X-axis direction and a second direction, for example, a Y-axis direction. The display layer 121, the common electrode 122, and the touch panel 110 may be stacked in a direction vertical to the first surface S1, for example, a Z-axis direction. As illustrated, the common electrode 122 may be arranged between the display layer 121 and the touch panel 110. Parasitic capacitances $C_{RX}$ may be formed at the plurality of sensing electrodes SE of the touch panel 110, and parasitic capacitances (for example, $C_S$ and $C_G$) may be formed between the common electrode 122 and the display layer 121.

Recently, according to the tendency of the touch screen (100 in FIG. 1) to be ultra-thin, the distance between the touch panel 110 and the common electrode 122 has decreased, and thus, the parasitic capacitance $C_{RX}$ has increased. Due to an increase in parasitic capacitance $C_{RX}$, an inflow of the display noise into the sensing signal $S_{SEN}$ may increase, and accordingly, it may be difficult to identify whether a change of the sensing signal $S_{SEN}$ (illustrated in FIG. 1) is because of the touch input or the display noise.

However, the touch controller (210 in FIG. 1) according to various embodiments may receive, from a sensing electrode, a sensing signal in which display noise has been offset, by detecting the display noise flowing into the touch panel 110, generating a driving voltage including the display noise, and sensing the capacitance of the sensing electrode to which the display noise has been applied, based on the driving voltage including the display noise. Thus, the display noise may be removed from touch data, which is generated based on the sensing signals.

Figure 4:
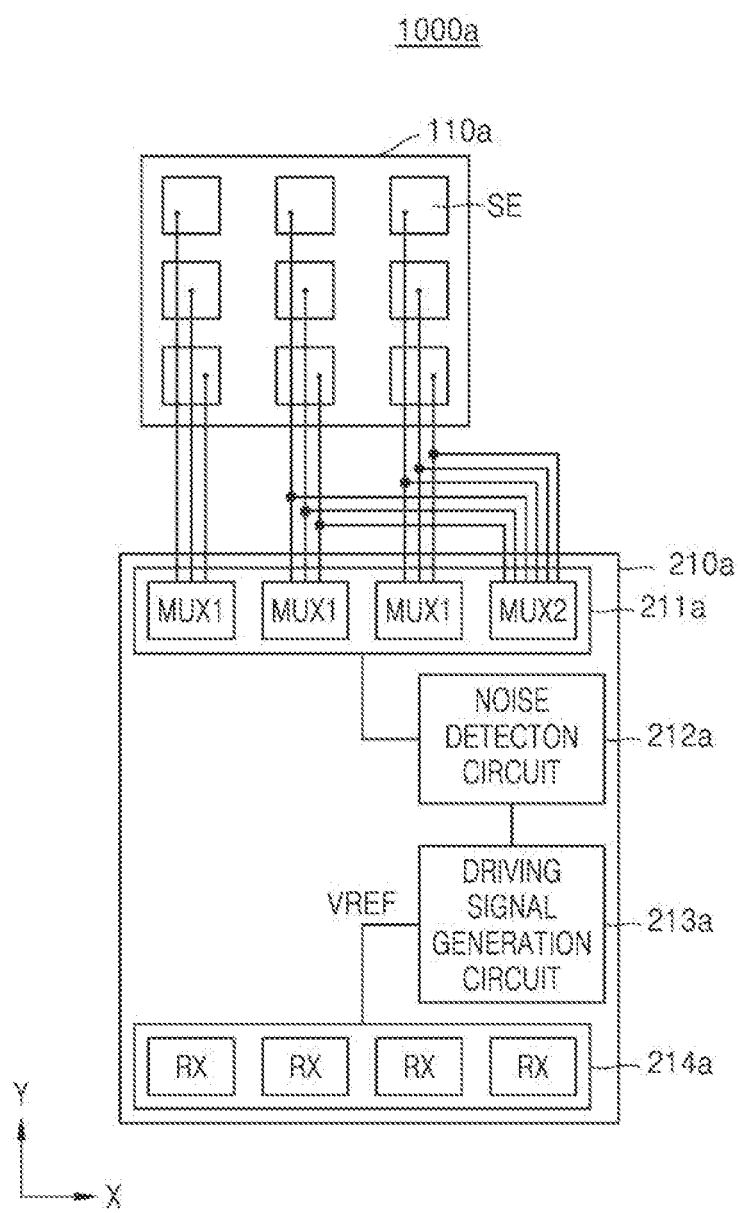
FIG. 4 is a block diagram schematically illustrating a touch panel and a touch controller, according to an embodiment.

FIG. 4 is a block diagram schematically illustrating a touch panel 110a and a touch controller 210a.

Referring to FIG. 4, a touch screen device 1000a may include the touch panel 110a and the touch controller 210a. The touch panel 110a may include the plurality of sensing electrodes SE (or referred to as a "dot sensor") arranged in rows and columns, and each of the plurality of sensing electrodes SE may receive the driving signal and output the sensing signal via wires connected thereto. In this case, the touch panel 110a may sense in a self-capacitance manner.

The touch controller 210a may include a selection circuit 211a, a noise detection circuit 212a, a driving signal generation circuit 213a, and a receiving circuit 214a.

The selection circuit 211a may include a plurality of selectors, for example, a plurality of first multiplexers MUX1 and a second multiplexer MUX2, and the receiving circuit 214a may include a plurality of receivers RX. In some embodiments, a plurality of the second multiplexer MUX2 may be provided. The plurality of first multiplexers MUX1 may electrically connect the sensing electrode SE selected from a plurality of sensing electrodes SE (for example, a sensing electrode currently performing a sensing operation) to its corresponding receiver RX among the plurality of receivers RX. The second multiplexer MUX2 may electrically connect two sensing electrodes SE, which do not currently perform a sensing operation, among the plurality of sensing electrodes SE to the noise detection circuit 212a.

The noise detection circuit 212a may detect noise (for example, the display noise) of the sensing electrodes not performing a touch sensing operation. The noise detection circuit 212a may provide reference voltages for detecting the display noise to electrodes arranged on lines other than a line on which the touch sensing is performed, among the plurality of sensing electrodes SE of the touch panel 110a. The driving signal generation circuit 213a may receive the noise voltages generated based on the reference voltages from the noise detection circuit 212a. The driving signal generation circuit 213a may alternately output the noise voltages based on a logic level of a selection signal VSELF (see FIG. 5). The receiving circuit 214a may receive a driving signal VREF output from the driving signal generation circuit 213a (or provided from the driving signal generation circuit 213a). The receiving circuit 214a may include the plurality of receivers RX.

Each of the plurality of receivers RX may operate as a transmitter and a receiver. The sensing electrodes SE arranged on a same column among the plurality of sensing electrodes SE may be connected to the receiver RX via a same first multiplexer MUX1.

The sensing electrodes SE not performing the touch sensing operation may be connected to the noise detection circuit 212a and the driving signal generation circuit 213a. The noise detection circuit 212a may receive, from the plurality of sensing electrodes SE, the noise voltages generated based on the reference voltages, and the driving signal generation circuit 213a may generate the driving signal VREF based on the noise voltages and provide the generated driving signal VREF to the receiver RX.

Although not illustrated in FIG. 4, the touch controller 210a may further include an encoder, a decoder, and a touch processor.

Figure 5:
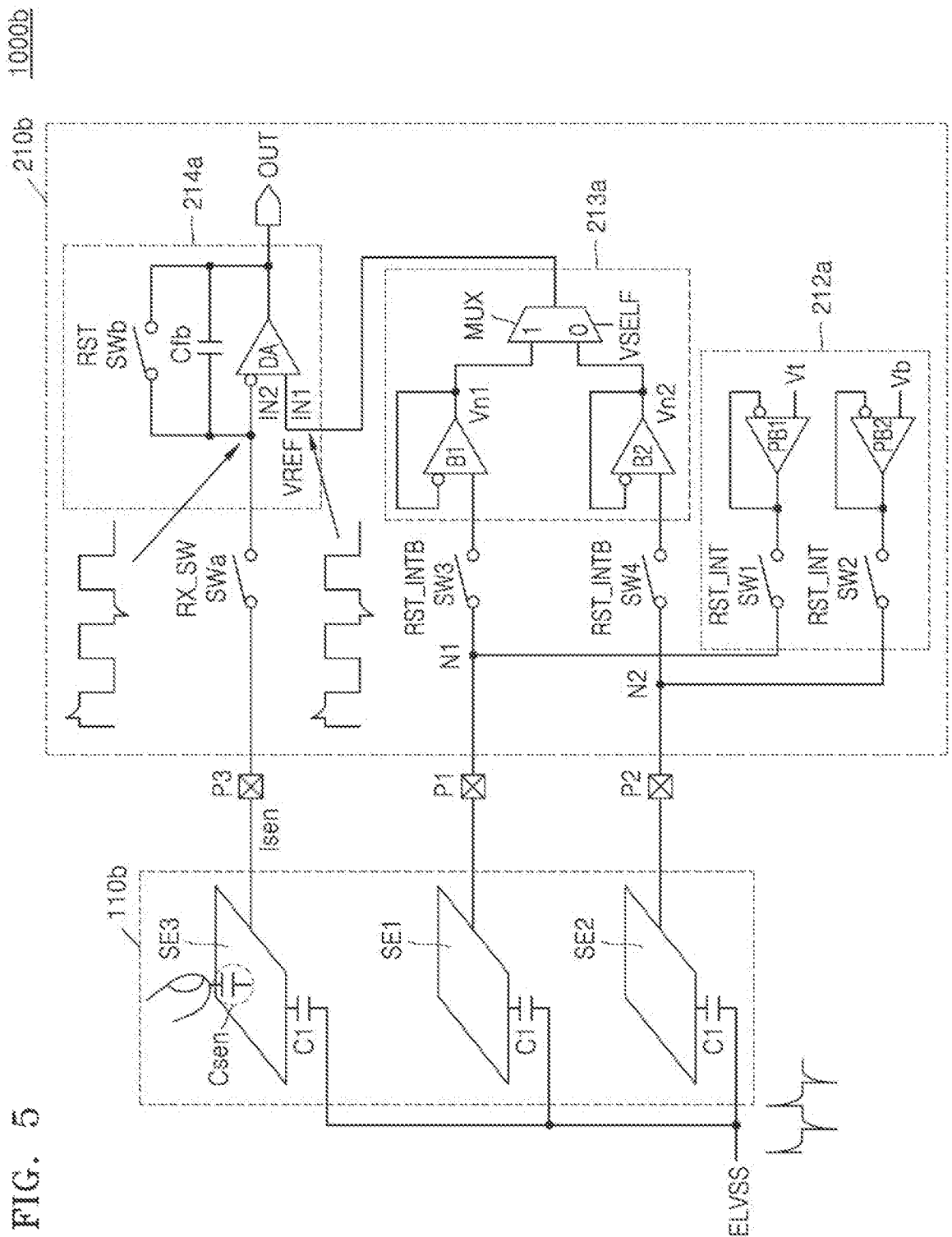
FIG. 5 is a circuit diagram of structures of a touch panel and a touch controller, according to an embodiment.

FIG. 5 is a circuit diagram of structures of a touch panel 110b and a touch controller 210b, according to an embodiment.

Referring to FIG. 5, a touch screen device 1000b may include the touch panel 110b and the touch controller 210b. The touch panel 110b and the touch controller 210b in FIG. 5 may respectively correspond to the touch panel 110 and the touch controller 210 in FIG. 1, and may also respectively correspond to the touch panel 110a and the touch controller 210a in FIG. 4. Duplicate descriptions given with respect to FIG. 4 are omitted for conciseness.

The touch panel 110b may include a first electrode SE1, a second electrode SE2, and a third electrode SE3. The first electrode SE1 and the second electrode SE2 may be electrodes arranged on a line or lines other than a line on which the touch sensing is performed, and the third electrode SE3 may be an electrode arranged on the line on which the touch sensing is performed. The third electrode SE3 may be an electrode on which the touch sensing is performed, a sensing capacitor Csen may be formed between the third electrode SE3 and a finger of the user or a stylus, etc., and the sensing capacitor Csen may be a self-capacitor. A parasitic capacitor C1 may be formed in the first through third electrodes SE1 through SE3. The parasitic capacitor C1 connected to each of the first through third electrodes SE1 through SE3 may be connected to a ground voltage ELVSS that is equal to or less than the second power voltage ELVSS illustrated in FIG. 2.

The first through third electrodes SE1 through SE3 may be connected to a first resistor R1, a second resistor R2, and a third resistor R3, respectively, and may be connected to a first output terminal P1, a second output terminal P2, and a third output terminal P3 of the touch panel 110b, respectively.

The touch controller 210b may include the noise detection circuit 212a, the driving signal generation circuit 213a, and the receiving circuit 214a.

The noise detection circuit 212a may include a first precharge buffer PB1 and a second precharge buffer PB2. The noise detection circuit 212a may provide a first reference voltage Vt and a second reference voltage Vb for detecting display noise from the first electrode SE1 and the second electrode SE2, in which the touch sensing is not performed, respectively. The first precharge buffer PB1 may precharge the first electrode SE1 with the first reference voltage Vt, and the second precharge buffer PB2 may precharge the second electrode SE2 with the second reference voltage Vb. The first reference voltage Vt may be different from the second reference voltage Vb. In some embodiments, the first reference voltage Vt may be higher than the second reference voltage Vb. For example, in some embodiments, the first reference voltage Vt may be about 2 V and the second reference voltage Vb may be about 1 V.

The noise detection circuit 212a may include a first switch SW1 and a second switch SW2. One end of the first switch SW1 may be connected to an output terminal of the first precharge buffer PB1. One end of the second switch SW2 may be connected to an output terminal of the second precharge buffer PB2. The first switch SW1 and the second switch SW2 may be turned on by an active level (for example, logic high) of the initial reset signal RST_INT (illustrated in FIG. 7). As the first switch SW1 and the second switch SW2 are turned on, the first reference voltage Vt and the second reference voltage Vb may be respectively applied to the first electrode SE1 and the second electrode SE2 respectively connected to the other end of the first switch SW1 and the other end of the second switch SW2. That is, when the first switch SW1 and the second switch SW2 are turned on, the first reference voltage Vt and the second reference voltage Vb may be respectively applied to the first electrode SE1 and the second electrode SE2. Thereafter, the first switch SW1 and the second switch SW2 may be turned off by an inactive level (for example, logic low) of the initial reset signal RST_INT. A first node N1 and a second node N2 connected to the first electrode SE1 and the second electrode SE2 may have a first noise voltage Vn1 in which the display noise has been added to the first reference voltage Vt, and a second noise voltage Vn2 in which the display noise has been added to the second reference voltage Vb, respectively.

In other words, the first node N1 may have the first noise voltage Vn1 obtained by adding the first reference voltage Vt, output from the first precharge buffer PB1, to the display noise, by turning on the first switch SW1. The second node N2 may have the second noise voltage Vn2 obtained by adding the second reference voltage Vb, output from the second precharge buffer PB2, to the display noise, by turning on the second switch SW2.

The driving signal generation circuit 213a may include a first buffer B1, a second buffer B2, and a multiplexer MUX. The driving signal generation circuit 213a, and specifically the multiplexer MUX, may receive the first noise voltage Vn1 and the second noise voltage Vn2, and may alternately select the received first noise voltage Vn1 and the received second noise voltage Vn2 and output the selected first noise voltage Vn1 and the second noise voltage Vn2 as the driving signal VREF.

The first buffer B1 may be an amplifier having a first input terminal connected to a third switch SW3. The first buffer B1 may receive the first noise voltage Vn1 as the third switch SW3 is turned on. That is, the first buffer B1 may receive the first noise voltage Vn1 when the third switch SW3 is turned on. The first buffer B1 may output and/or provide the received first noise voltage Vn1 to the multiplexer MUX. The second buffer B2 may be an amplifier having a second input terminal connected to a fourth switch SW4. The second buffer B2 may receive the second noise voltage Vn2 as the fourth switch SW4 is turned on. The second buffer B2 may output and/or provide the received second noise voltage Vn2 to the multiplexer MUX.

Figure 7:
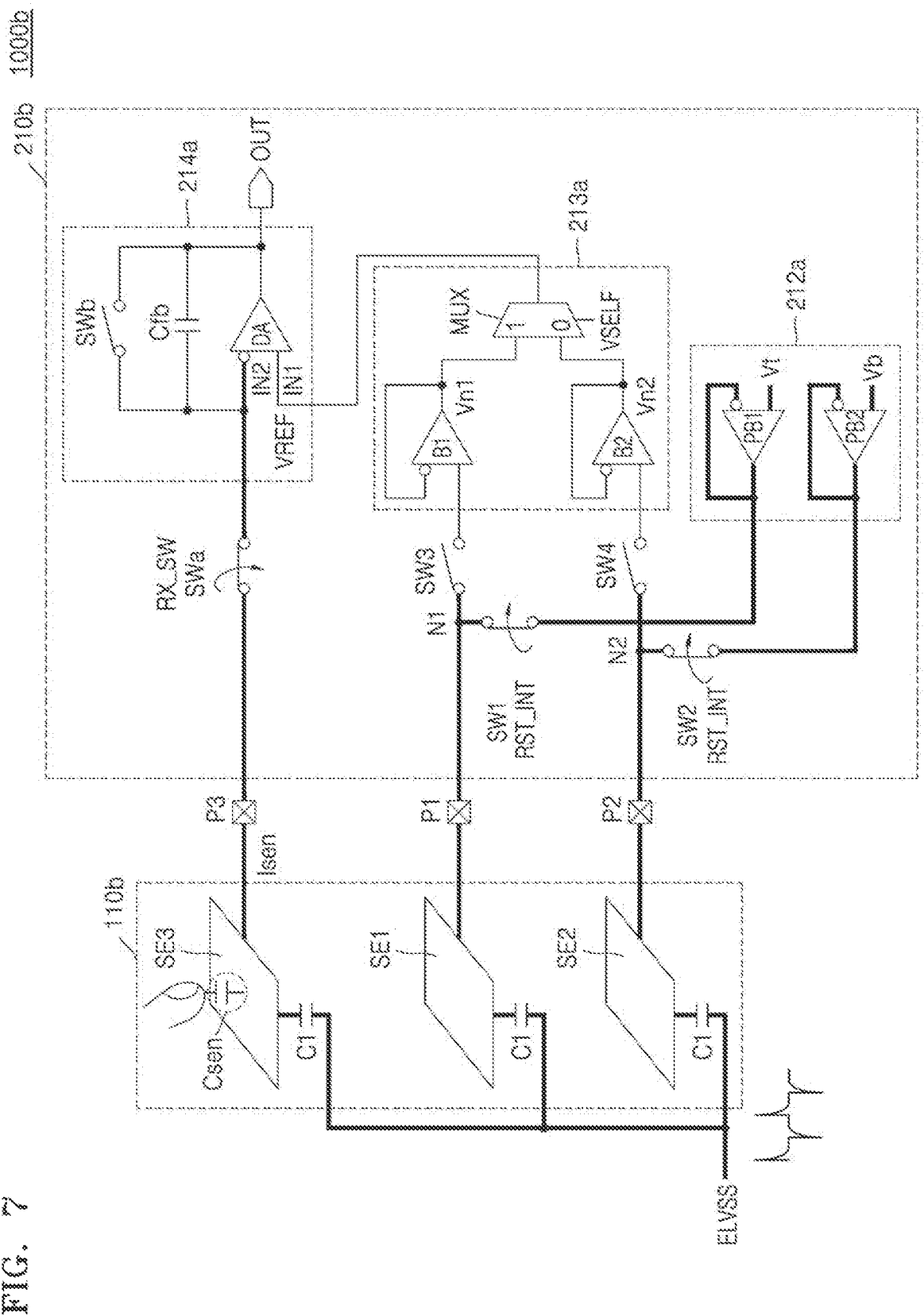
FIGS. 7 through 10 are diagrams illustrating a display noise removing method, according to some embodiments.

The third switch SW3 and the fourth switch SW4 may be turned on by an inverted initial reset signal (RST_INTB, illustrated in FIG. 7). As the third switch SW3 and the fourth switch SW4 are turned on, the first node N1 and the second node N2 respectively connected to the other end of the third switch SW3 and the other end of the fourth switch SW4 may have the first noise voltage Vn1 and the second reference voltage Vb, in which the display noise is added to the second reference voltage Vb. That is, when the third switch SW3 and the fourth switch SW4 are turned on, the first node N1 and the second node N2 respectively may have the first noise voltage Vn1 and the second reference voltage Vb, in which the display noise is added to the second reference voltage Vb. In other words, the first node N1 may have the first noise voltage Vn1 obtained by adding the first reference voltage Vt to the display noise, by turning on the third switch SW3. The second node N2 may have the second noise voltage Vn2 obtained by adding the second reference voltage Vb to the display noise, by turning on the fourth switch SW4. The third switch SW3, the fourth switch SW4, the first switch SW1, and the second switch SW2 may operate complementarily. For example, when the third switch SW3 and the fourth switch SW4 are turned on, the first switch SW1 and the second switch SW2 may be turned off, and when the third switch SW3 and the fourth switch SW4 are turned off, the first switch SW1 and the second switch SW2 may be turned on.

The multiplexer MUX may receive the first noise voltage Vn1 and the second noise voltage Vn2 from the first buffer B1 and the second buffer B2, respectively. The multiplexer MUX may alternately select the first noise voltage Vn1 and the second noise voltage Vn2, based on the selection signal VSELF which has a certain frequency, and output the selected first and second noise voltages Vn1 and Vn2 as the driving signal VREF. The selection signal VSELF may be a square wave having a certain frequency. For example, when the logic level of the selection signal VSELF is high, the multiplexer MUX may select the first noise voltage Vn1, but conversely, when the logic level of the selection signal VSELF is low, the multiplexer MUX may select the second noise voltage Vn2.

The receiving circuit 214a may include one of the plurality of receivers RX illustrated in FIG. 4. The receiving circuit 214a may include an amplifier DA, a capacitor Cfb, and a reset switch SWb. The receiving circuit 214a may receive the driving signal VREF from the driving signal generation circuit 213a, and may receive a touch sensing signal from the third electrode SE3 of the touch panel 110. A touch sensing signal may be generated based on the driving signal VREF and the touch sensing signal.

The amplifier DA may include a first input terminal IN1 receiving the driving signal VREF from the driving signal generation circuit 213a and a second input terminal IN2 receiving the touch sensing signal from the third electrode SE3. In some embodiments, the amplifier DA may generate a sensing voltage from a sensing current Isen based on a touch sensing signal. The amplifier DA may be implemented as a differential amplifier. The capacitor Cfb may be connected between the second input terminal IN2 and the output terminal of the amplifier DA, and the reset switch SWb may be connected in parallel with the capacitor Cfb. The reset switch SWb may be turned on in response to a reset signal (RST, illustrated in FIG. 6).

Figure 6:
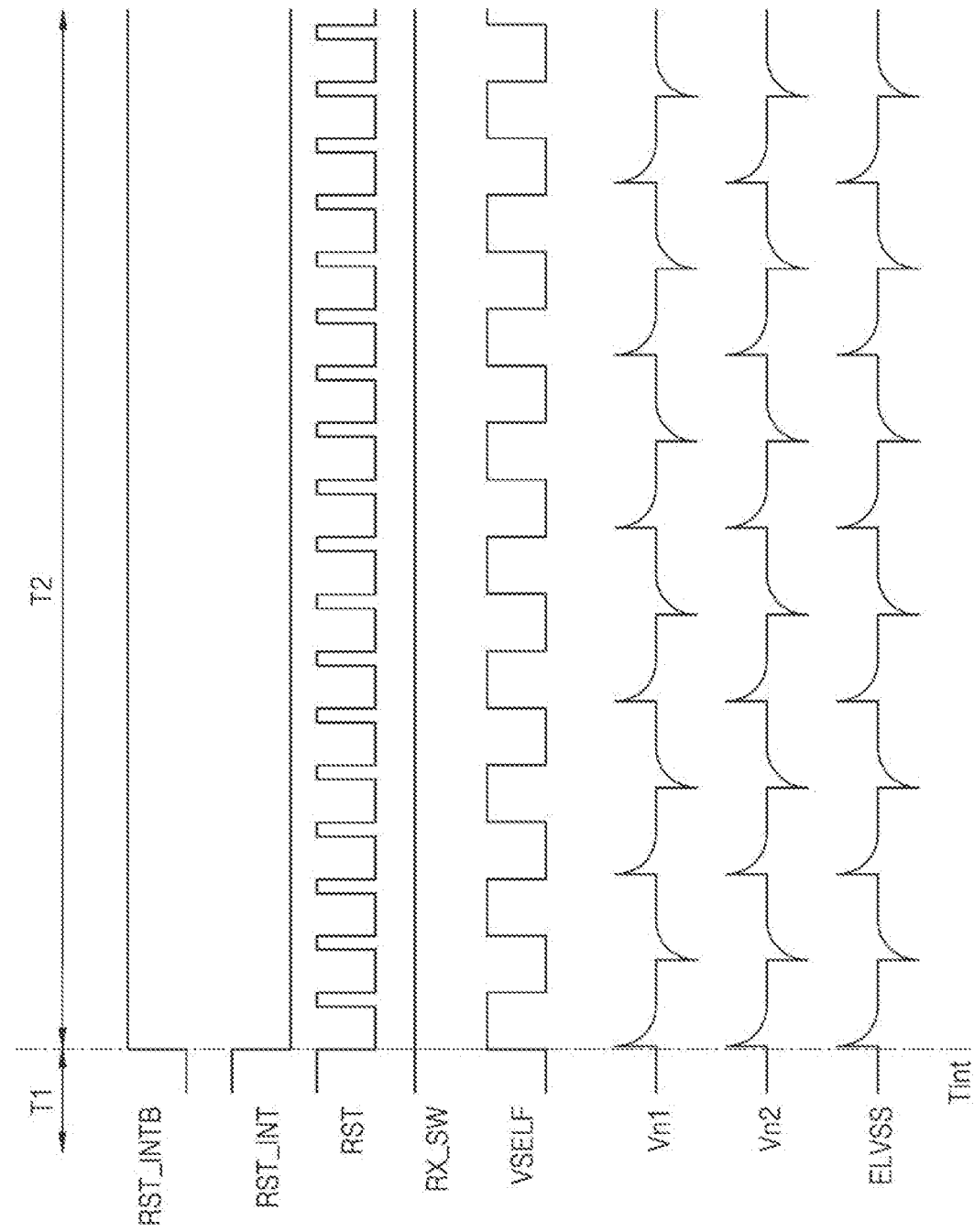
FIG. 6 is a timing diagram of a touch panel and a touch controller, according to an embodiment.

FIG. 6 is a timing diagram of the touch panel 110 and the touch controller 210, according to an embodiment.

Referring to FIG. 6, timings of the initial reset signal RST_INT, a reset signal RST, a receiver signal RX_SW, the selection signal VSELF, the first noise voltage Vn1, the second noise voltage Vn2, and the ground voltage ELVSS are illustrated.

The initial reset signal RST_INT may be turned on before an initial time Tint, and may be turned off after the initial time Tint. Conversely, the inverted initial reset signal RST_INTB may be turned off before the initial time Tint, and may be turned on at or after the initial time Tint. The reset signal RST may have a plurality of pulse signals from the initial time Tint. The receiver signal RX_SW may always be in a turn-on state regardless of the initial time Tint. In some embodiments, the receiver signal RX_SW may be a signal having a phase opposite to that of the reset signal RST, that is, a complimentary signal of the reset signal RST. The selection signal VSELF may be a square wave having a certain frequency, as discussed above. The first noise voltage Vn1, the second noise voltage Vn2, and the ground voltage ELVSS may have a plurality of pulse signals including the display noise from the initial time Tint.

FIGS. 7 through 10 are diagrams illustrating a display noise removing method, according to some embodiments.

Referring to FIG. 7, a touch sensing signal may be generated by the sensing capacitor Csen in the third electrode SE3, on which the touch sensing is performed.

The parasitic capacitor C1 connected to each of the first electrode SE1 and the second electrode SE2, in which the touch sensing is not performed, may receive the ground voltage ELVSS.

In a first period, which is an initial period, the first precharge buffer PB1 may precharge the first electrode SE1 with the first reference voltage Vt to detect the display noise in the first electrode SE1. When the first switch SW1 is turned on in response to the initial reset signal RST_INT, the first precharge buffer PB1 may provide the first reference voltage Vt to the first electrode SE1. The second precharge buffer PB2 may precharge the second electrode SE2 with the second reference voltage Vb to detect the display noise in the second electrode SE2. When the second switch SW2 is turned on in response to the initial reset signal RST_INT, the second precharge buffer PB2 may provide the second reference voltage Vb to the second electrode SE2.

Figure 8:
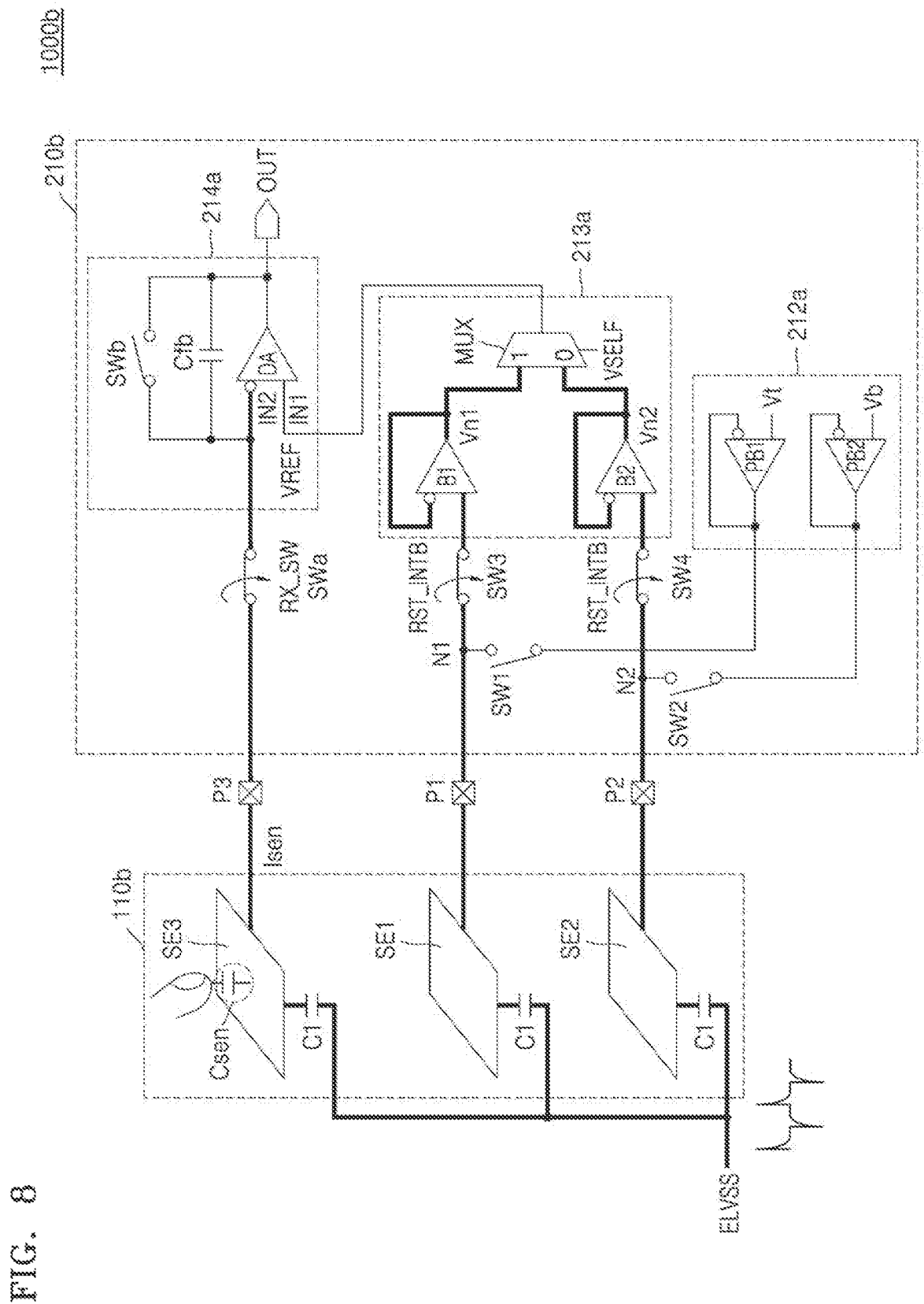

Referring to FIG. 8, when the third switch SW3 is turned on in response to the inversion initial reset signal RST_INT, the first buffer B1 may receive the first noise voltage Vn1. When the fourth switch SW4 is turned on in response to the inverted initial reset signal RST_INTB, the second buffer B2 may receive the second noise voltage Vn2. The driving signal generation circuit 213a may alternately select the first noise voltage Vn1 and the second noise voltage Vn2 by using the multiplexer MUX in response to the selection signal VSELF and output the selected first or second noise voltage Vn1 or Vn2 as the driving signal VREF. For example, referring to FIGS. 6 and 8, in the case of an active level (for example, logic high) of the selection signal VSELF, the multiplexer MUX may output the first noise voltage Vn1 as the driving signal VREF. To the contrary, in the case of the inactive level (for example, logic low) of the selection signal VSELF, the multiplexer MUX may output the second noise voltage Vn2 as the driving signal VREF.

Figure 9:
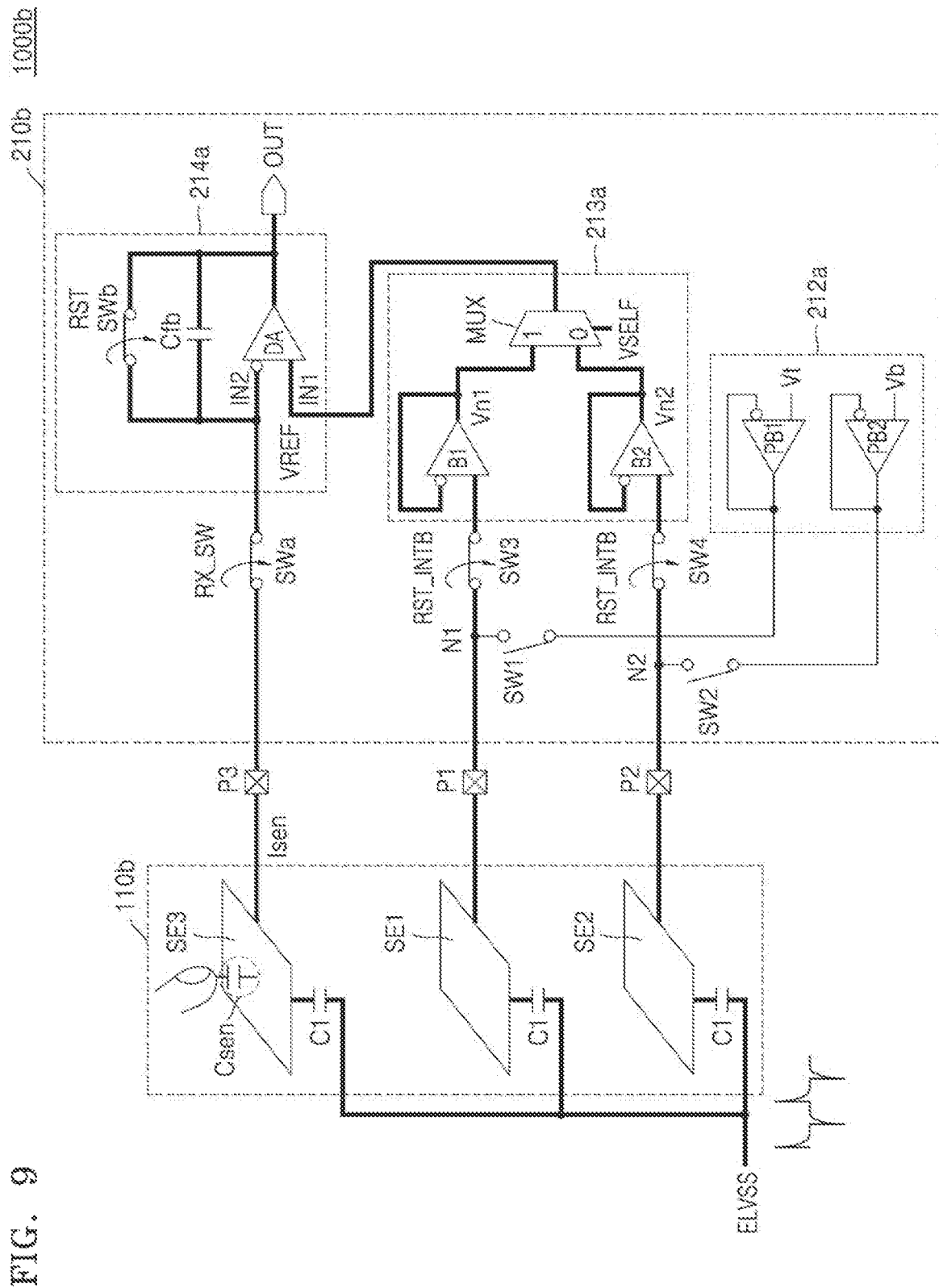

Referring to FIG. 9, the parasitic capacitor C1 connected to the third electrode SE3 may receive the ground voltage ELVSS. The third electrode SE3 may receive a touch sensing signal and output the sensing current Isen. The sensing current Isen may be provided to the amplifier DA of the receiving circuit 214a via the second input terminal IN2.

The receiving circuit 214a may receive the driving signal VREF via the first input terminal IN1, and receive the sensing current Isen, which is a touch sensing signal, from the second input terminal IN2. A touch sensing signal may be generated based on the driving signal VREF. The receiving circuit 214a may improve the sensitivity of the touch sensing signal by receiving the driving signal VREF reflecting the display noise and the sensing current Isen and removing the display noise therefrom.

Figure 10:
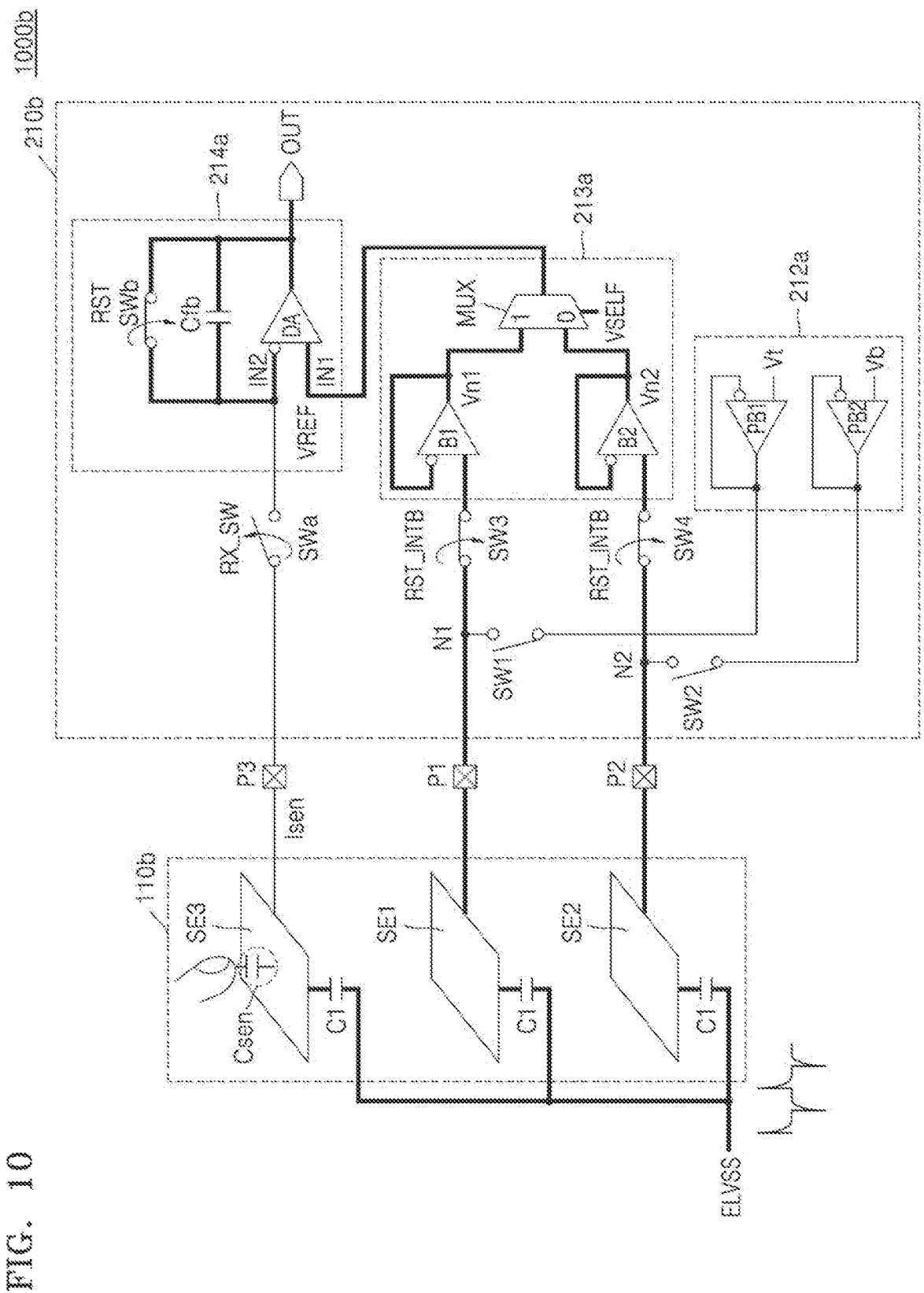

Referring to FIG. 10, the reset switch SWb may be turned on in response to the reset signal RST. When the reset signal RST is logic high, the reset operation may be performed. At the time of the reset operation, the reset switch SWb may be turned on and accordingly, the second input terminal IN2 of the amplifier DA may be reset.

Figure 11:
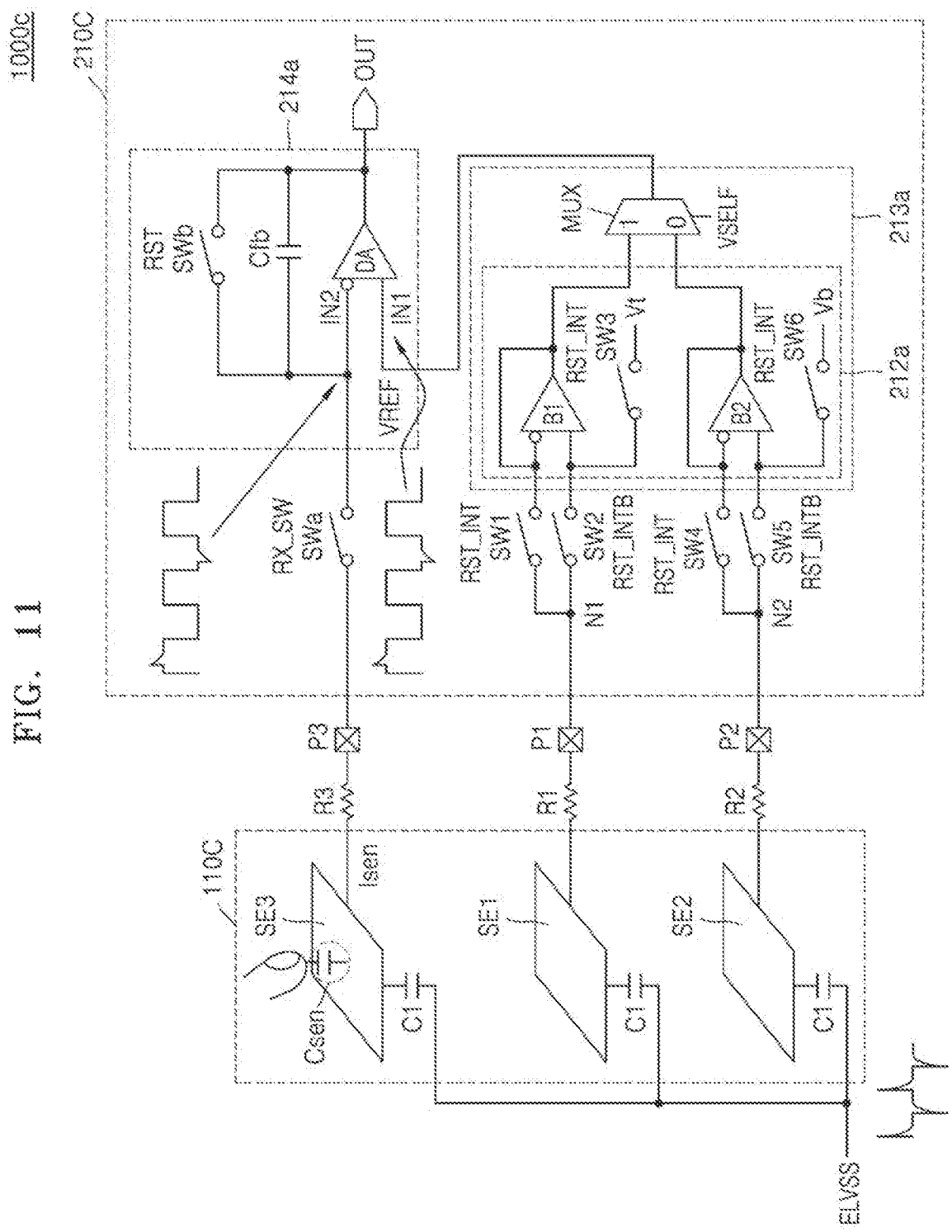
FIG. 11 is a circuit diagram of structures of a touch panel and a touch controller, according to an embodiment.

FIG. 11 is a circuit diagram of structures of a touch panel 110c and a touch controller 210c, according to an embodiment.

Referring to FIG. 11, a touch screen device 1000c may include the touch panel 110c and the touch controller 210c. The touch controller 210c may include the noise detection circuit 212a, the driving signal generation circuit 213a, and the receiving circuit 214a. The touch panel 110c and the touch controller 210c may correspond to the touch panel 110 and the touch controller 210 in FIG. 1, respectively, and may correspond to the touch panel 110a and the touch controller 210a in FIG. 4, respectively. Hereinafter, duplicate descriptions are omitted for conciseness.

The noise detection circuit 212a may include the first buffer B1 and the second buffer B2. The noise detection circuit 212a may provide a first reference voltage Vt and a second reference voltage Vb for detecting display noise from the first electrode SE1 and the second electrode SE2, in which the touch sensing is not performed, respectively. The first buffer B1 may precharge the first electrode SE1 to the first reference voltage Vt, and the second buffer B2 may precharge the second electrode SE2 to the second reference voltage Vb. The first reference voltage Vt may be different from the second reference voltage Vb, and the first reference voltage Vt may be greater than the second reference voltage Vb. For example, in some embodiments, the first reference voltage Vt may be about 2 V, and the second reference voltage Vb may be about 1 V.

The noise detection circuit 212a may be connected to the first switch SW1, the second switch SW2, the third switch SW3, the fourth switch SW4, a fifth switch SW5, and a sixth switch SW6. One end of the third switch SW3 may be connected to one end (for example, an input end) of the first buffer B1. One end of the sixth switch SW6 may be connected to one end (for example, an input end) of the second buffer B2. The first switch SW1, the third switch SW3, the fourth switch SW4, and the sixth switch SW6 may be turned on by an active level (for example, logic high) of the initial reset signal RST_INT (illustrated in FIG. 6). When the third switch SW3 is turned on, the first reference voltage Vt may be applied to the first electrode SEL. When the sixth switch SW6 is turned on, the second reference voltage Vb may be applied to the second electrode SE2.

Thereafter, the first switch SW1 may be turned on, and the first reference voltage Vt may be applied to the first electrode SE1. The fourth switch SW4 may be turned on, and the second reference voltage Vb may be applied to the second electrode SE2.

Thereafter, the first switch SW1, the third switch SW3, the fourth switch SW4, and the sixth switch SW6 may be turned off by an inactive level (for example, logic low) of the initial reset signal RST_INT. A first node N1 and the second node N2 connected to the first electrode SE1 and the second electrode SE2 may have a first noise voltage Vn1, in which the display noise has been added to the first reference voltage Vt, and a second noise voltage Vn2, in which the display noise has been added to the second reference voltage Vb, respectively.

In other words, the first node N1 may have the first noise voltage Vn1 obtained by adding the first reference voltage Vt, output from the first buffer B1 by turning on the first switch SW1 and the third switch SW3, to the display noise. The second node N2 may have a second noise voltage Vn2 obtained by adding the second reference voltage Vb, output from the second buffer B2 by turning on the fourth switch SW4 and the sixth switch SW6, to the display noise.

The driving signal generation circuit 213a may include the first buffer B1, the second buffer B2, and the multiplexer MUX. The second switch SW2 and the fifth switch SW5 may be turned on by an active level (for example, logic high) of the inverted initial reset signal RST_INTB (illustrated in FIG. 6). When the second switch SW2 is turned on, the first noise voltage Vn1 may be applied to the first buffer B1, and when the fifth switch SW5 is turned on, the second noise voltage Vn2 may be applied to the second buffer B2.

The driving signal generation circuit 213a may receive the first noise voltage Vn1 and the second noise voltage Vn2, and may alternately select the received first noise voltage Vn1 and the received second noise voltage Vn2 and output them as the driving signal VREF.

The first buffer B1 may receive the first noise voltage Vn1 as the second switch SW2 is turned on. The first buffer B1 may output and/or provide the received first noise voltage Vn1 to the multiplexer MUX. The second buffer B2 may receive the second noise voltage Vn2 as the fifth switch SW5 is turned on. The second buffer B2 may output and/or provide the received second noise voltage Vn2 to the multiplexer MUX.

The first switch SW1, the third switch SW3, the fourth switch SW4, and the sixth switch SW6 may complementarily operate with the second switch SW2 and the fifth switch SW5. For example, when the first switch SW1, the third switch SW3, the fourth switch SW4, and the sixth switch SW6 are turned on, the second switch SW2 and the fifth switch SW5 may be turned off. To the contrary, when the first switch SW1, the third switch SW3, the fourth switch SW4, and the sixth switch SW6 are turned off, the second switch SW2 and the fifth switch SW5 may be turned on.

The multiplexer MUX may alternately select the first noise voltage Vn1 and the second noise voltage Vn2, in response to the selection signal VSELF which has a certain frequency, and output the driving signal VREF (for example, a driving voltage). Accordingly, a square wave signal, to which noise is added, may be output as the driving signal VREF. For example, when the logic level of the selection signal VSELF is high, the multiplexer MUX may select the first noise voltage Vn1, but conversely, when the logic level of the selection signal VSELF is low, the multiplexer MUX may select the second noise voltage Vn2.

The receiving circuit 214a may include the amplifier DA, the capacitor Cfb, and the reset switch SWb. The receiving circuit 214a may receive the driving signal VREF from the driving signal generation circuit 213a, and may receive a touch sensing signal from the third electrode SE3 of the touch panel 110. A touch sensing signal may be generated based on the driving signal VREF and the touch sensing signal.

The amplifier DA may include a first input terminal IN1 receiving a driving signal VREF from the driving signal generation circuit 213a and a second input terminal IN2 receiving a touch sensing signal from the third electrode SE3. In some embodiments, the amplifier DA may generate a sensing voltage based on a touch sensing signal. The capacitor Cfb may be connected between the second input terminal IN2 and the output terminal of the amplifier DA, and the reset switch SWb may be connected in parallel with the capacitor Cfb. The reset switch SWb may be turned on in response to the reset signal.

The receiving circuit 214a may receive, from the third electrode SE3, a touch sensing signal (for example, a sensing current), and may convert the touch sensing signal into the sensing voltage.

Figure 12:
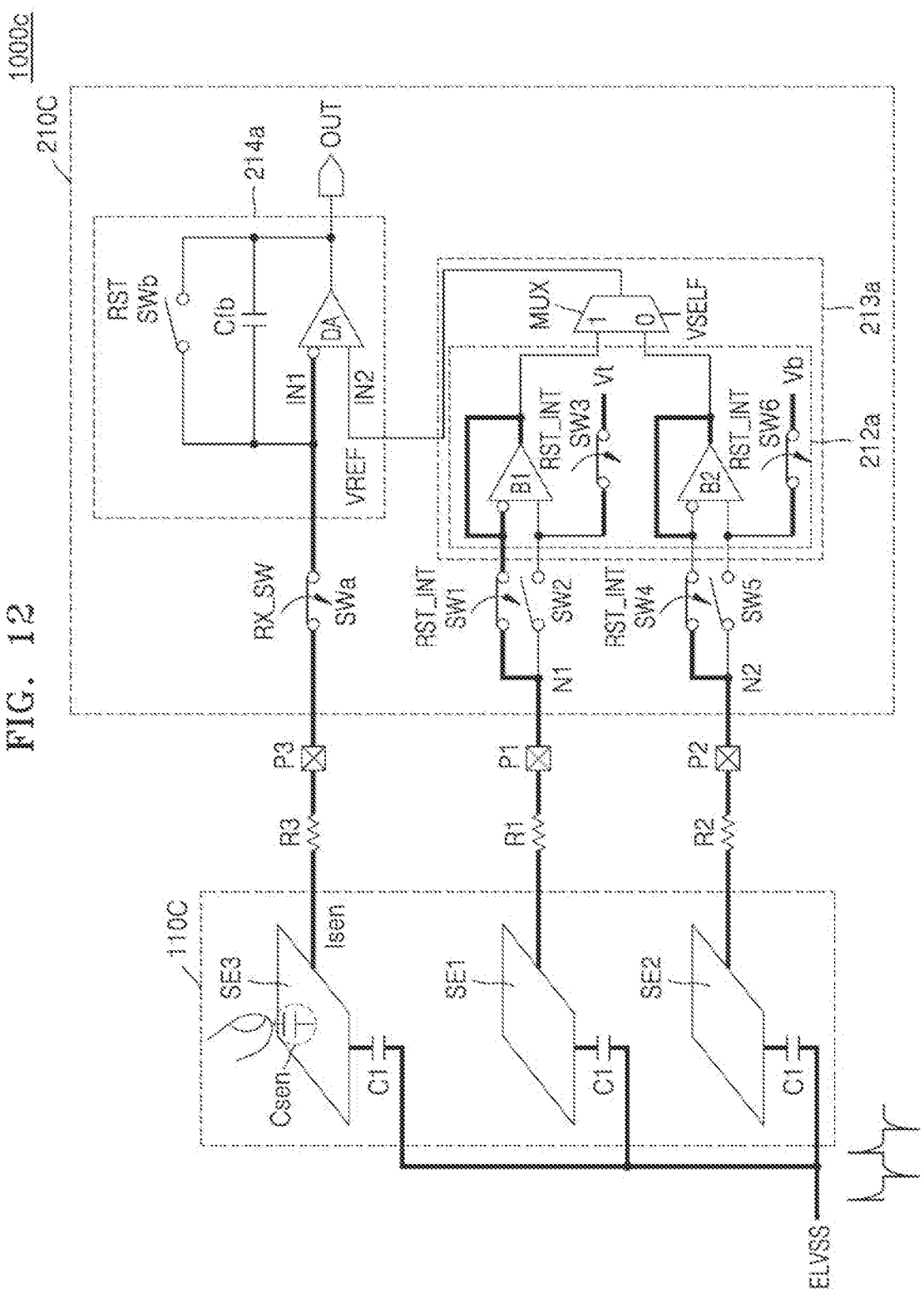
FIGS. 12 through 14 are diagrams illustrating a display noise reduction method, according to some embodiments.
Figure 13:
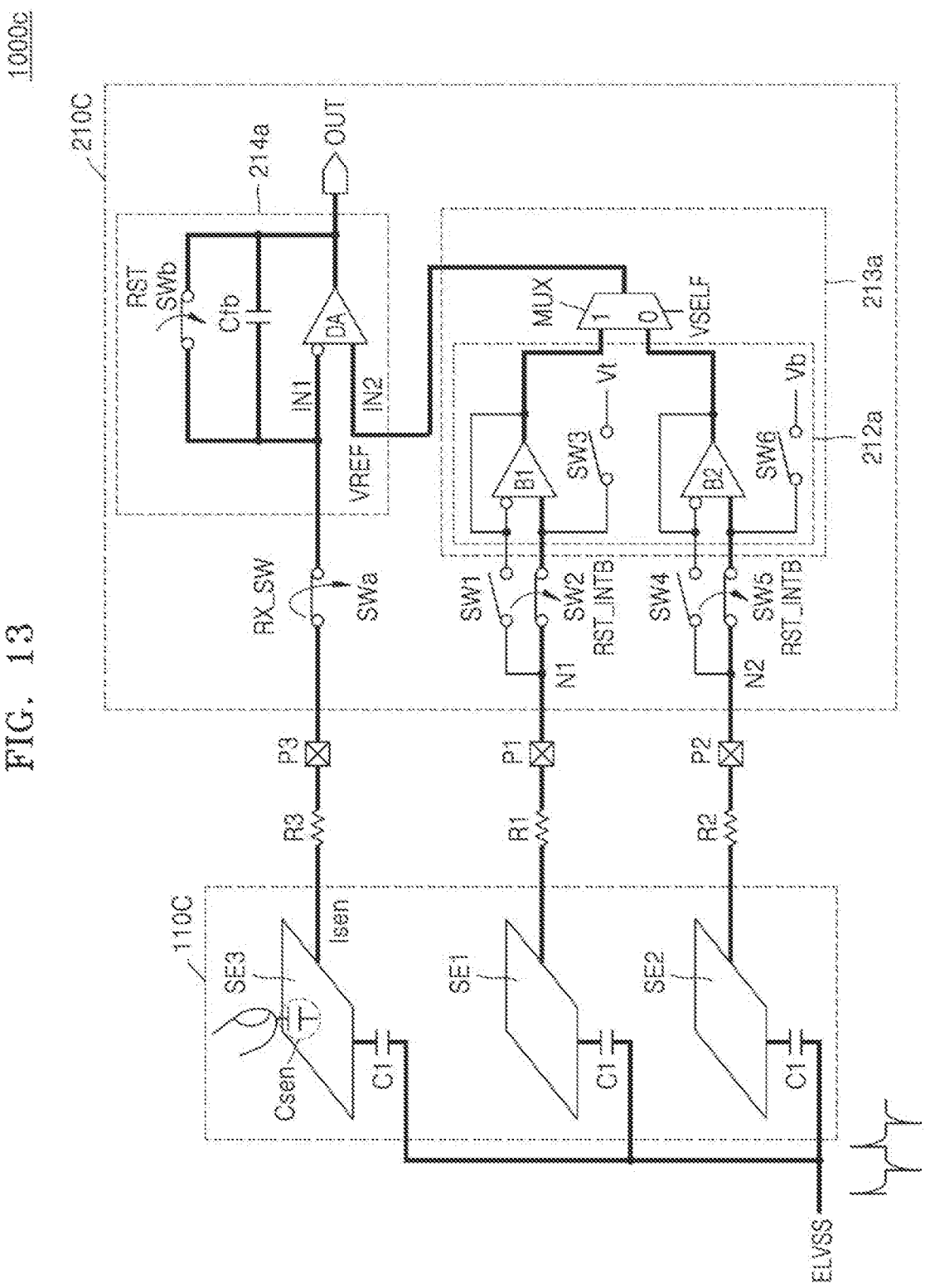
Figure 14:
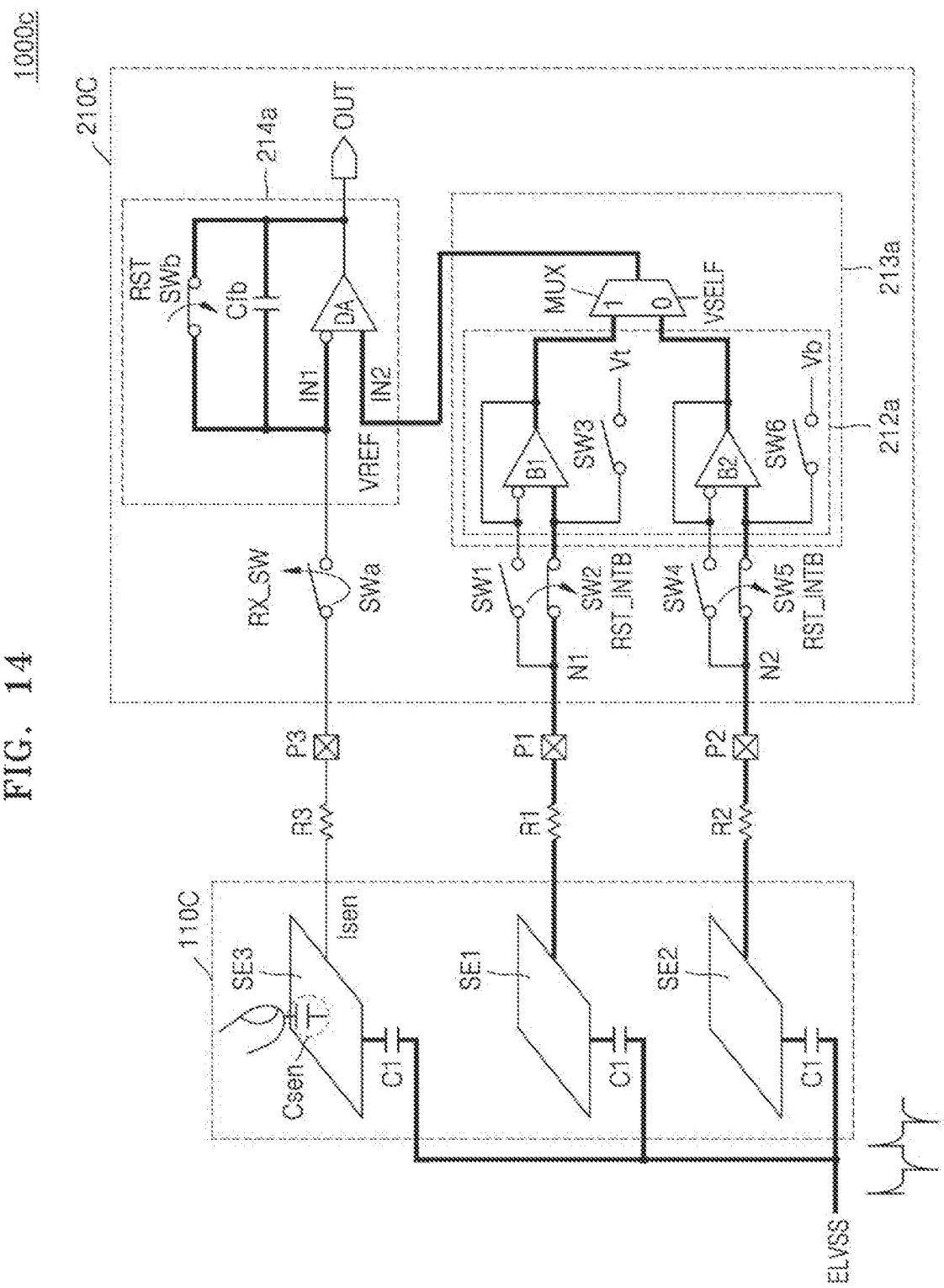

FIGS. 12 through 14 are diagrams illustrating a display noise reduction method, according to some embodiments.

Referring to FIG. 12, a touch sensing signal may be generated by the sensing capacitor Csen in the third electrode SE3, on which the touch sensing is performed. The third electrode SE3 may receive the ground voltage ELVSS via the parasitic capacitor C1 connected to the third electrode SE3. The first electrode SE1 and the second electrode SE2, on which the touch sensing has not been performed, may receive the ground voltage ELVSS via the parasitic capacitor C1 connected to each of the first electrode SE1 and the second electrode SE2.

The first buffer B1 may precharge the first electrode SE1 to the first reference voltage Vt to detect the display noise in the first electrode SE1. When the first switch SW1 is turned on, the first buffer B1 may provide the first reference voltage Vt to the first electrode SEL. The second buffer B2 may precharge the second electrode SE2 to the second reference voltage Vb to detect the display noise in the second electrode SE2. When the second switch SW2 is turned on, the second buffer B2 may provide the second reference voltage Vb to the second electrode SE2.

The third electrode SE3 may output the sensing signal to the output terminal P3 thereof. When a switch SWa of the receiving circuit 214a is turned on, the sensing signal may be provided via the second input terminal IN2 of the amplifier DA.

Referring to FIG. 13, when the second switch SW2 is turned on in response to the inverted initial reset signal RST_INTB, the first buffer B1 may receive the first noise voltage Vn1. When the fifth switch SW5 is turned on in response to the inverted initial reset signal RST_INTB, the second buffer B2 may receive the second noise voltage Vn2. In response to the selection signal VSELF, the multiplexer MUX may alternately select the first noise voltage Vn1 and the second noise voltage Vn2 to output the driving signal VREF. Hereinafter, it will be described that the first noise voltage Vn1 and the second noise voltage Vn2 are alternately selected with reference to FIGS. 15 and 16.

Referring to FIG. 14, the parasitic capacitor C1 connected to the third electrode SE3 may receive the ground voltage ELVSS. The third electrode SE3 may receive a touch sensing signal and output the sensing current Isen. The sensing current Isen may be provided to the amplifier DA of the receiving circuit 214a via the second input terminal IN2.

The receiving circuit 214a may receive the driving signal VREF via the first input terminal IN1, and receive the sensing current Isen, which is a touch sensing signal, from the second input terminal IN2. The touch sensing signal may be generated based on the driving signal VREF. The receiving circuit 214a may improve the sensitivity of the touch sensing signal by receiving the driving signal VREF reflecting the display noise and the sensing current Isen and removing the display noise therefrom.

Referring to FIG. 14, the reset switch SWb may be turned on in response to the reset signal RST. When the reset signal RST is logic high, the reset operation may be performed. At the time of the reset operation, the reset switch SWb may be turned on and accordingly, the second input terminal IN2 of the amplifier DA may be reset.

Figure 15:
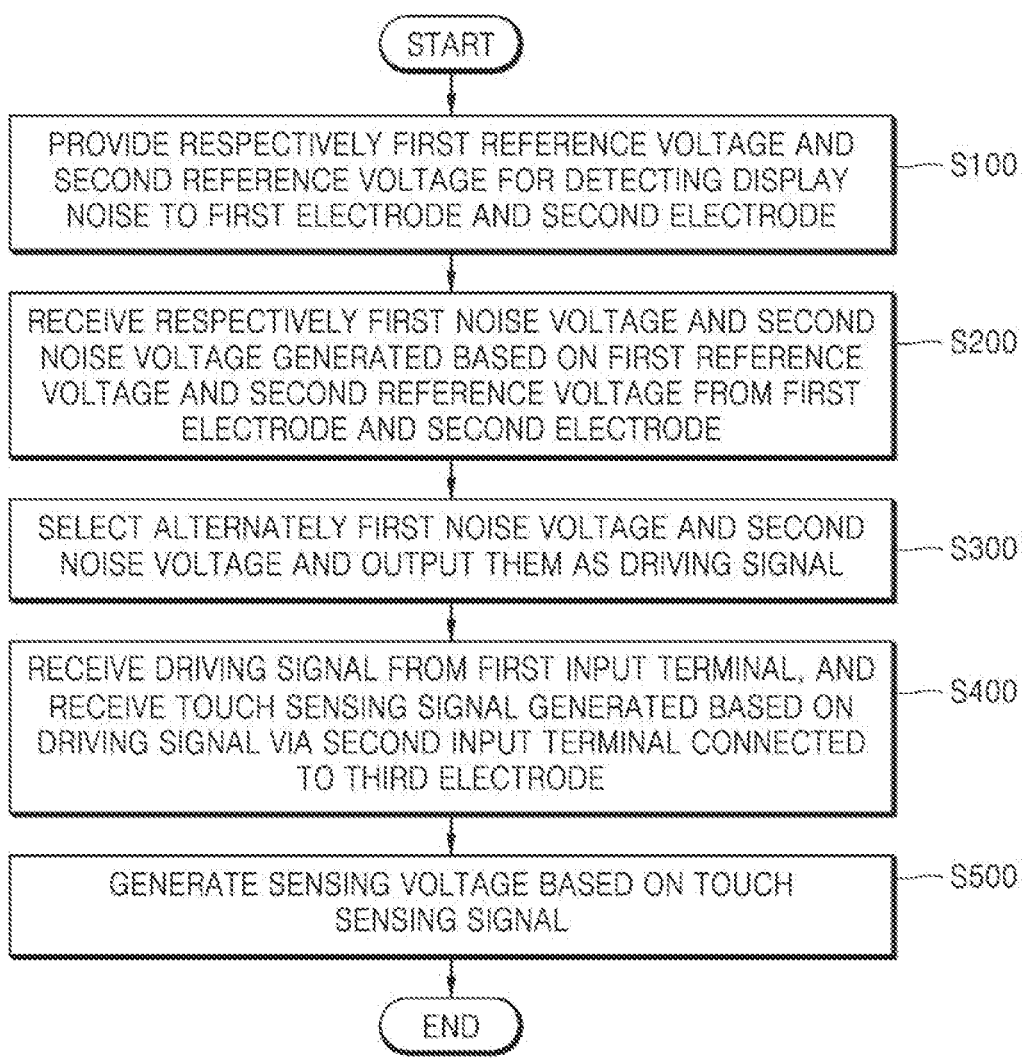
FIG. 15 is a flowchart of an operating method of a touch controller, according to an embodiment.

FIG. 15 is a flowchart of an operating method of a touch controller, according to an embodiment.

Because the operating method of a touch controller shown in FIG. 15 has been described with reference to FIGS. 5 through 16, duplicate descriptions are omitted for conciseness.

Referring to FIG. 15, the touch controller may provide a first reference voltage and a second reference voltage for detecting display noise to a first electrode and a second electrode of a touch panel, respectively (S100).

In operation S100, the touch controller may provide the first reference voltage to the first electrode during a first period, and may further provide the second reference voltage to the second electrode.

The touch controller may receive a first noise voltage and a second noise voltage generated based on the first reference voltage and the second reference voltage from the first electrode and the second electrode, respectively (S200).

In operation S200, during a second period that is different from the first period, a driving signal generation circuit may receive and output the first noise voltage, in which display noise is added to the first reference voltage, and an operation of receiving and outputting the second noise voltage, in which the display noise is added to the second reference voltage, may be further included.

The driving signal generation circuit may alternately select the first noise voltage and the second noise voltage, and output the selected voltage as driving signals (S300).

A receiving circuit may receive the driving signal via a first input terminal, and receive a touch sensing signal generated based on the driving signal via a second input terminal connected to a third electrode arranged on a line, on which the touch sensing is performed (S400).

The third electrode of the touch panel may generate a sensing voltage based on a touch sensing signal (S500).

Figure 16:
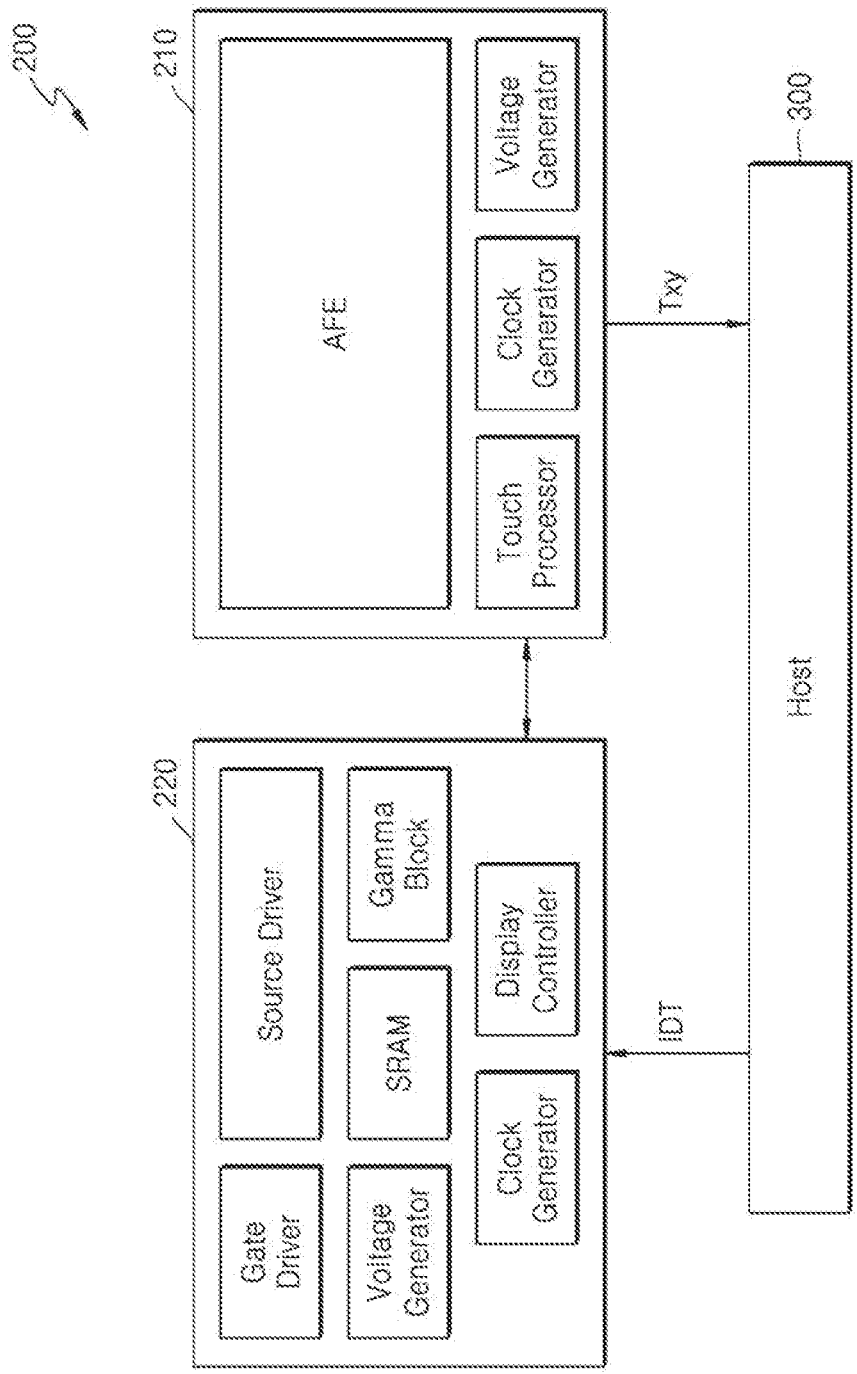
FIGS. 16 and 17 are diagrams of implementation examples of a touch screen driving circuit, according to some embodiments.
Figure 17:
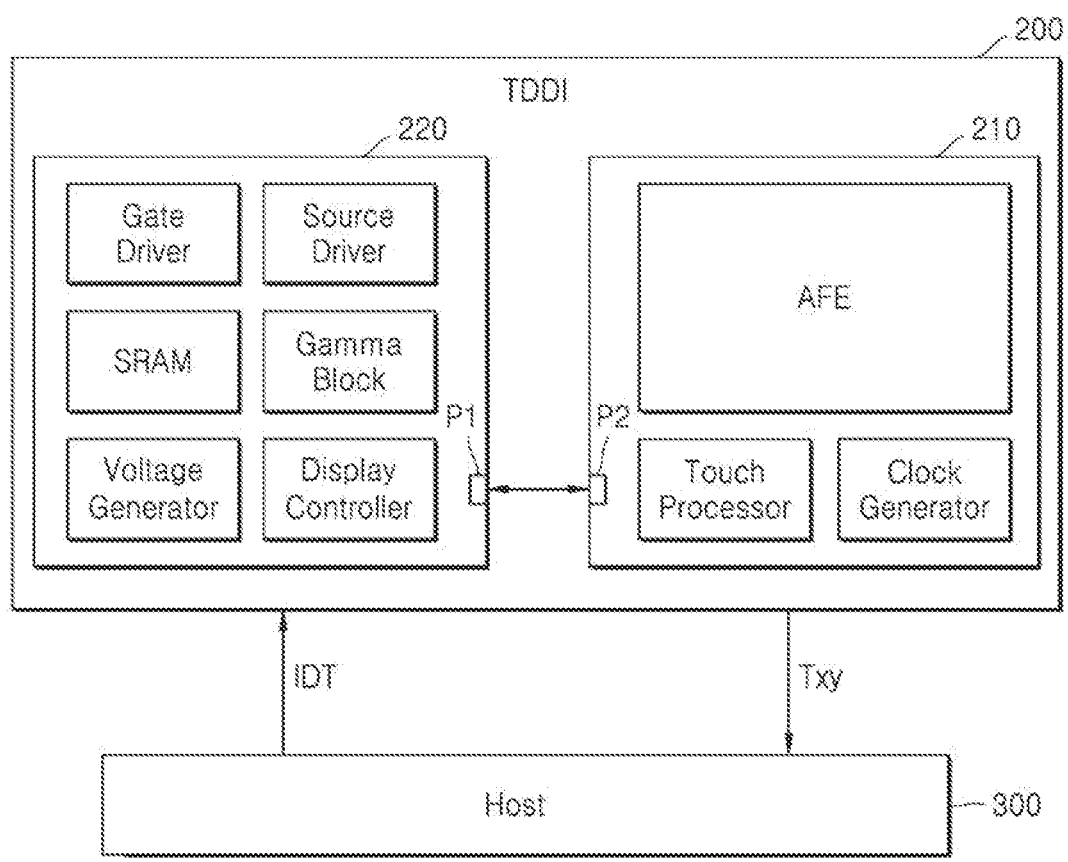

FIGS. 16 and 17 are diagrams of implementation examples of the touch screen driving circuit 200, according to some embodiments.

Referring to FIG. 16, the touch screen driving circuit 200 may include the touch controller 210 and the DDI 220. In an embodiment, the touch controller 210 and the DDI 220 may be implemented as separate semiconductor chips. In an embodiment, at least one of the touch controller 210 and the DDI 220 may be implemented as a plurality of semiconductor chips.

The touch controller 210 and the DDI 220 may operate under the control of the host 300, and the DDI 220 may receive the image data IDT from the host 300 and drive the display panel 120 to display an image on the display panel (120 in FIG. 1) according to the image data IDT.

The touch controller 210 may scan the touch panel (110 in FIG. 1), calculate the touch coordinate Txy based on sensing signals received from the touch panel 110, or detect a touch input (or proximity of a conductive object). The touch sensor controller 210 may provide the touch coordinate Txy to the host 300.

The touch controller 210 may improve the sensitivity of the touch sensing signal, by arranging a plurality of sensing electrodes on the touch panel (110 in FIG. 1), detecting the display noise by using the plurality of sensing electrodes, on which the touch sensing has not been performed, and compensating for or removing the display noise.

The touch controller 210 may improve the sensitivity of the touch sensing signal, by generating the sensing voltage based on the touch sensing signal, and removing the display noise by alternately selecting and outputting the display noise voltage.

Referring to FIG. 16, the touch controller 210 may include an analog-front end (AFE), the touch processor, a clock generator, and a voltage generator. In some embodiments, the touch controller 210 may include interface circuits for communication with the host 300 and the DDI 220. As a non-limiting example, the interface circuit for communication with the host 300 may be implemented as one of various interfaces, such as a universal serial bus (USB) interface, a universal flash storage (UFS) interface, a multimedia controller (MMC) interface, an embedded MMC (eMMC) interface, a peripheral component interconnect express (PCIe) interface, an advanced technology attachment (ATA) interface, a serial ATA (SATA) interface, a parallel ATA (PATA) interface, a small computer system interface (SCSI), a serial attached SCSI (SAS), an enhanced small disk interface (ESDI), an integrated drive electronics (IDE) interface, and a high speed serial interface, and the interface circuit for communication with the DDI 220 may be implemented as one method of a universal asynchronous receiver transmitter (UART) interface, an inter integrated circuit (I2C) interface, a serial peripheral interface (SPI), a mobile industry processor interface (MIPI), or an embedded display port (eDP) interface.

The clock generator may generate a clock signal used inside the touch controller 210, and the voltage generator may generate voltages used in the AFE.

The touch processor may control the overall operation of the touch controller 210.

The DDI 220 may include a clock generator, a display controller, a voltage generator, a gamma block, static random access memory (RAM) (SRAM), a gate driver, and a source driver. In some embodiments, the DDI 220 may include interface circuits for communication with the host 300 and a touch driving circuit TDI.

The clock generator may generate the clock signals used internally by the DDI 220, for example, the clock signals provided to the source driver and the gate driver. The voltage generator may generate voltages used by the gate driver and the source driver, and the gamma block may generate a plurality of gradation voltages corresponding to a plurality of gradations available to pixel values and provide the generated plurality of gradation voltages to the source driver. The SRAM may store the image data IDT received from the host 300, and for example, the SRAM may store the image data IDT in a plurality of line units or store the image data IDT in one frame, and provide the image data IDT in line units to the source driver.

The gate driver may sequentially provide scan signals to a plurality of scan lines provided in the display panel (120 in FIG. 1), and the source driver may simultaneously provide image signals, for example, data voltages, to a plurality of data lines provided in the display panel 120.

The display controller may control the overall operation of the DDI 220.

In an embodiment, the DDI 220 and the touch controller 210 may communicate with each other, and the DDI 220 and the touch controller 210 may include interface circuits for communication. As a non-limiting example, the interface circuit for communication between the DDI 220 and the touch controller 210 may be implemented as one of various interfaces, such as a USB interface, a UFS interface, an MMC interface, an eMMC interface, a PCIe interface, an ATA interface, a SATA interface, a PATA interface, an SCSI, an SAS, an ESDI, an IDE interface, or a high speed serial interface, and the interface circuit for communication with the DDI 220 may be implemented as one method of a UART interface, an I2C interface, an SPI, an MIPI, or an eDP interface.

Referring to FIG. 17, the touch screen driving circuit 200 may include the touch controller 210 and the DDI 220, and the touch screen driving circuit 200 may be integrated into one semiconductor chip and referred to as a touch display driving circuit TDDI.

The touch controller 210 may include an AFE and a touch processor for driving the touch panel (110 in FIG. 1), and the DDI 220 may include a gate driver, a source driver, SRAM, a gamma block, and a display controller for driving the display panel (120 in FIG. 1). The touch controller 210 or the DDI 220 may include a clock generator for generating at least one clock signal used in the touch screen driving circuit 200 and a voltage generator for generating a plurality of voltages. In FIG. 17, it is illustrated that the clock generator is provided in the touch controller 210 and a voltage generator is provided in the DDI 220, but embodiments are not limited thereto. The touch screen driving circuit 200 may further include an interface circuit for communication with the host 300.

The touch controller 210 and the DDI 220 may communicate with each other in the touch screen driving circuit 200, and the touch controller 210 and the DDI 220 may include ports for communication with each other, for example, a first port P1 and a second port P2, respectively. A clock signal and a voltage may be transceived via a data line connected between the first port P1 and the second port P2.

The touch controller 210 may improve the sensitivity of the touch sensing signal, by arranging a plurality of sensing electrodes on the touch panel (110 in FIG. 1), detecting the display noise by using the plurality of sensing electrodes, on which the touch sensing has not been performed, and compensating for or removing the display noise.

The touch controller 210 may improve the sensitivity of the touch sensing signal, by generating the sensing voltage based on the touch sensing signal, and removing the display noise by alternately selecting and outputting the display noise voltage.

While various embodiments have been particularly shown and described with reference to the drawings, it will be understood that various changes in form and details may be made therein without departing from the spirit and scope of the following claims.

What is claimed is:

1. A touch controller stacked on a display panel, and configured to drive a touch sensor array comprising a plurality of sensing electrodes arranged in rows and columns, the touch controller comprising:
   a noise detection circuit configured to respectively provide a first reference voltage and a second reference voltage for detecting display noise to a first electrode and a second electrode arranged on lines except a line on which touch sensing is performed, among the plurality of sensing electrodes, the second reference voltage being different from the first reference voltage;
   a driving signal generation circuit configured to receive a first noise voltage and a second noise voltage generated based on the first reference voltage and the second reference voltage from the first electrode and the second electrode, respectively, and alternately select the first noise voltage and the second noise voltage as a driving signal and output the driving signal; and
   a receiving circuit configured to receive the driving signal via a first input terminal, receive a touch sensing signal generated based on the driving signal via a second input terminal connected to a third electrode arranged on the line on which touch sensing is performed, among the plurality of sensing electrodes, and generate a sensing voltage based on the touch sensing signal and the driving signal.

2. The touch controller of claim 1, wherein the noise detection circuit comprises:
   a first precharge buffer configured to precharge the first electrode to the first reference voltage; and
   a second precharge buffer configured to precharge the second electrode to the second reference voltage.

3. The touch controller of claim 1, wherein the noise detection circuit comprises:
   a first switch connected between a first node connected to the first electrode and an output terminal of a first precharge buffer that outputs the first reference voltage; and
   a second switch connected between a second node connected to the second electrode and an output terminal of a second precharge buffer that outputs the second reference voltage.

4. The touch controller of claim 3, wherein the first switch and the second switch are turned on by an initial reset signal, and
   wherein, when the first switch is turned on, the first node has the first noise voltage, in which the display noise is added to the first reference voltage, and
   wherein, when the second switch is turned on, the second node has the second noise voltage, in which the display noise is added to the second reference voltage.

5. The touch controller of claim 1, wherein the driving signal generation circuit comprises:
   a first buffer configured to receive the first noise voltage from a first node and output the first noise voltage via a first output terminal;
   a second buffer configured to receive the second noise voltage from a second node and output the second noise voltage via a second output terminal; and
   a multiplexer configured to receive the first noise voltage and the second noise voltage and alternately output the first noise voltage and the second noise voltage as the driving signal, based on a selection signal which has a certain frequency.

6. The touch controller of claim 5, wherein the driving signal generation circuit comprises:
   a third switch between the first node and the first input terminal; and
   a fourth switch between the second node and the second input terminal.

7. The touch controller of claim 6, wherein the third switch and the fourth switch are turned on by an inverted initial reset signal,
   wherein, when the third switch is turned on, the first buffer outputs the first noise voltage, and
   wherein, when the fourth switch is turned on, the second buffer outputs the second noise voltage.

8. The touch controller of claim 1, wherein the receiving circuit comprises:
   an amplifier including the first input terminal, to which the driving signal that is output by the driving signal generation circuit is applied, and the second input terminal connected to the third electrode;
   a capacitor connected between the second input terminal and an output terminal of the amplifier; and
   a reset switch connected to the capacitor in parallel.

9. The touch controller of claim 1, wherein the noise detection circuit comprises:
   a first buffer configured to provide the first reference voltage to the first electrode, during a first period; and
   a second buffer configured to provide the second reference voltage to the second electrode, during the first period.

10. The touch controller of claim 9, wherein the driving signal generation circuit comprises:
    the first buffer configured to output the first noise voltage in which the display noise is added to the first reference voltage, during a second period that is different from the first period;
    the second buffer configured to output the second noise voltage in which the display noise is added to the second reference voltage, during the second period; and
    a multiplexer configured to receive the first noise voltage and the second noise voltage and alternately output the first noise voltage and the second noise voltage as the driving signal, based on a selection signal which has a certain frequency,
    wherein the first buffer and the second buffer of the driving signal generation circuit are the first buffer and the second buffer, respectively, of the noise detection circuit.

11. The touch controller of claim 9, wherein the first buffer comprises:
    a first switch provided with the first reference voltage; and
    a second switch provided with the first noise voltage, and
    wherein the second buffer comprises:
    a third switch provided with the second reference voltage; and
    a fourth switch provided with the second noise voltage.

12. The touch controller of claim 11, wherein the first switch and the third switch are turned on by an initial reset signal, and
    the second switch and the fourth switch are turned on by an inverted initial reset signal.

13. A touch sensing device comprising:
    a touch sensor array including a plurality of sensing electrodes stacked on a display panel and arranged in rows and columns; and
    a touch controller connected to the touch sensor array via the plurality of sensing electrodes,
    wherein the touch sensor array comprises:
    a first electrode and a second electrode arranged on lines except a line on which touch sensing is performed, among the plurality of sensing electrodes; and
    a third electrode arranged on the line on which the touch sensing is performed, among the plurality of sensing electrodes, and
    wherein the touch controller comprises:
    a noise detection circuit configured to respectively provide a first reference voltage and a second reference voltage for detecting display noise to the first electrode and the second electrode, the second reference voltage being different from the first reference voltage;
    a driving signal generation circuit configured to receive a first noise voltage and a second noise voltage that are generated based on the first reference voltage and the second reference voltage from the first electrode and the second electrode, respectively, and alternately select the first noise voltage and the second noise voltage as a driving signal and output the driving signal; and
    a receiving circuit configured to receive the driving signal via a first input terminal, receive a touch sensing signal generated based on the driving signal via a second input terminal connected to the third electrode, and generate a sensing voltage based on the touch sensing signal and the driving signal.

14. The touch sensing device of claim 13, wherein the noise detection circuit comprises:
    a first precharge buffer configured to precharge the first electrode to the first reference voltage; and
    a second precharge buffer configured to precharge the second electrode to the second reference voltage.

15. The touch sensing device of claim 14, wherein the noise detection circuit comprises:
    a first switch connecting the first electrode and a first node to an output terminal of the first precharge buffer that outputs the first reference voltage; and
    a second switch connecting the second electrode and a second node to an output terminal of the second precharge buffer that outputs the second reference voltage.

16. The touch sensing device of claim 13, wherein the driving signal generation circuit comprises:
    a first buffer configured to receive the first noise voltage from a first node via a first input terminal of the first buffer and output the first noise voltage via a first output terminal of the first buffer;
    a second buffer configured to receive the second noise voltage from a second node via a second input terminal of the second buffer and output the second noise voltage via a second output terminal of the second buffer; and
    a multiplexer configured to receive the first noise voltage and the second noise voltage and alternately output the first noise voltage and the second noise voltage as the driving signal, based on a selection signal which has a certain frequency.

17. The touch sensing device of claim 16, wherein the driving signal generation circuit comprises:
    a third switch between the first node and the first input terminal; and
    a fourth switch between a second node and the second input terminal.

18. The touch sensing device of claim 17, wherein the third switch and the fourth switch are turned on by an inverted initial reset signal, wherein, when the third switch is turned on, the first buffer outputs the first noise voltage, and wherein, when the fourth switch is turned on, the second buffer outputs the second noise voltage.

19. The touch sensing device of claim 13, wherein the receiving circuit comprises:

an amplifier including the first input terminal to which a voltage output by the driving signal generation circuit is input, and the second input terminal connected to the third electrode;

a capacitor connected between the second input terminal and an output terminal of the amplifier; and a reset switch connected to the capacitor in parallel.

20. An operating method of a touch controller configured to drive a touch sensor array comprising a plurality of sensing electrodes stacked on a display panel, and arranged in rows and columns, the operating method comprising:

providing respectively a first reference voltage and a second reference voltage for detecting display noise to a first electrode and a second electrode arranged on lines except a line on which touch sensing is performed, among the plurality of sensing electrodes, the second reference voltage being different from the first reference voltage;

receiving a first noise voltage and a second noise voltage generated based on the first reference voltage and the second reference voltage from the first electrode and the second electrode, respectively;

selecting alternately the first noise voltage and the second noise voltage as a driving signal and outputting the driving signal;

receiving the driving signal from a first input terminal, and receiving a touch sensing signal generated based on the driving signal via a second input terminal connected to a third electrode arranged on the line on which touch sensing is performed, among the plurality of sensing electrodes; and generating a sensing voltage based on the touch sensing signal and the driving signal.

* * * * *